(12) United States Patent
Chen et al.

(10) Patent No.: US 9,491,724 B2
(45) Date of Patent: Nov. 8, 2016

(54) DATA TRANSMISSION SYSTEM AND METHOD WITH FEEDBACK REGARDING A DECODING CONDITION

(71) Applicant: NOVATEK Microelectronics Corp., Hsin-Chu (TW)

(72) Inventors: Chien-Yu Chen, Hsinchu County (TW); Kai-Wen Shao, Hsinchu (TW); Feng-Jung Kuo, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 468 days.

(21) Appl. No.: 13/831,739

(22) Filed: Mar. 15, 2013

(65) Prior Publication Data

US 2014/0126566 A1    May 8, 2014

(30) Foreign Application Priority Data

Nov. 6, 2012  (TW) .............................. 101141135 A

(51) Int. Cl.

| | |
|---|---|
| *H04W 56/00* | (2009.01) |
| *H04N 19/164* | (2014.01) |
| *H04N 19/166* | (2014.01) |
| *G09G 5/12* | (2006.01) |
| *H04N 19/89* | (2014.01) |
| *G06F 3/14* | (2006.01) |
| *H04N 21/43* | (2011.01) |
| *G06F 1/32* | (2006.01) |

(52) U.S. Cl.

CPC .............. *H04W 56/00* (2013.01); *G06F 1/324* (2013.01); *G06F 1/3218* (2013.01); *G06F 3/14* (2013.01); *G06F 3/1415* (2013.01); *G09G 5/12* (2013.01); *H04N 19/164* (2014.11); *H04N 19/166* (2014.11); *H04N 19/89* (2014.11); *H04N 21/4302* (2013.01)

(58) Field of Classification Search
None
See application file for complete search history.

(56) References Cited

U.S. PATENT DOCUMENTS

| | | | | |
|---|---|---|---|---|
| 5,228,026 | A | * | 7/1993 | Albrow et al. ................ 370/280 |
| 5,809,176 | A | * | 9/1998 | Yajima ........................... 382/247 |
| 6,473,607 | B1 | * | 10/2002 | Shohara et al. ........... 455/343.1 |

(Continued)

FOREIGN PATENT DOCUMENTS

| | | |
|---|---|---|
| TW | 200945270 | 11/2009 |
| TW | 200949560 | 12/2009 |
| TW | 201205276 | 2/2012 |

OTHER PUBLICATIONS

'Feedback-Based Error Control for Mobile Video Transmission' by Girod et al.*

(Continued)

*Primary Examiner* — Steven Snyder
(74) *Attorney, Agent, or Firm* — Winston Hsu; Scott Margo

(57) ABSTRACT

A data transmission system is utilized in a Mobile Industry Processor Interface (MIPI). A master device includes a control module for generating a control signal according to a feedback signal. A packet encoding module is coupled to the control module for encoding an original packet to be a transmission packet according to the original packet and the control signal to process a transmission operation. A slave device includes a packet decoding module for decoding the transmission packet to be the original packet or a related display device signal corresponding to the original packet to a display device. A feedback module is coupled to the packet decoding module for generating the feedback signal to the control module of the master device according to a decoding condition of the control module, so as to switch a transmission mode of the transmission operation.

38 Claims, 18 Drawing Sheets

(56) References Cited

U.S. PATENT DOCUMENTS

| | | | |
|---|---|---|---|
| 6,831,634 B1* | 12/2004 | Shigeta | 345/213 |
| 7,043,557 B2* | 5/2006 | Mesarina et al. | 709/231 |
| 8,018,418 B2* | 9/2011 | Tsao et al. | 345/98 |
| 8,494,049 B2* | 7/2013 | Buttimer | H04N 19/105 375/240.12 |
| 8,767,777 B2* | 7/2014 | Kobayashi | 370/477 |
| 2005/0123058 A1* | 6/2005 | Greenbaum et al. | 375/240.28 |
| 2007/0201492 A1* | 8/2007 | Kobayashi | 370/395.64 |
| 2007/0286246 A1* | 12/2007 | Kobayashi | 370/522 |
| 2008/0291855 A1* | 11/2008 | Bata et al. | 370/311 |
| 2009/0064231 A1 | 3/2009 | Butcher | |
| 2010/0265350 A1* | 10/2010 | Ogasawara et al. | 348/222.1 |
| 2011/0249127 A1* | 10/2011 | Zhang et al. | 348/192 |
| 2011/0310980 A1 | 12/2011 | Mathew | |
| 2012/0206461 A1* | 8/2012 | Wyatt et al. | 345/501 |
| 2013/0016775 A1* | 1/2013 | Varodayan et al. | 375/240.05 |
| 2013/0185574 A1* | 7/2013 | Nishikawa | G06F 1/3296 713/320 |
| 2013/0263201 A1* | 10/2013 | Chung-How | H04L 1/0003 725/116 |
| 2014/0306968 A1* | 10/2014 | Tan et al. | 345/519 |

OTHER PUBLICATIONS

Untitled Driver for Nokia 6100 lcd (Philips pcf8833) written by Alexander Kudjashev, copyright 2008.*

'Distributed Video Coding' by Bernd Girod et al., copyright 2005, IEEE.*

'Design of TFT_LCD Display System Based on S3C2440A' by Liang et al., Applied Mechanics and Materials, vols. 71-78, pp. 2022-2026, 2011.*

'Video Transcoding Architectures and Techniques: An Overview' by Anthony Vetro et al., IEEE Signal Processing Magazine, Mar. 2003.*

'Resynchronization of Motion Compensated Video Affected by ATM Cell Loss' by Paul Haskell and David Messerschmitt, copyright 1992 by IEEE.*

Design of LCD Driver Interface Based on MIPI-DSI Protocol, Langming Wen, China Master Thesis Database, Series of Information Technology, p. 4-31, May 3, 2011, South China University of Technology, Guangzhou, China.

Design of LCD Driver Interface Based on MIPI Specifications, Xiaofeng Su, China Master Thesis Database, Series of Information Technology, p. 5-50, Nov. 8, 2011, South China University of Technology, Guangzhou, China.

* cited by examiner

DATA TRANSMISSION SYSTEM AND METHOD WITH FEEDBACK REGARDING A DECODING CONDITION

BACKGROUND OF THE INVENTION

1. Field of the Invention

The present invention relates to a data transmission system and method, and more particularly, to a data transmission system and method which monitors a decoding condition of a slave device to correspondingly switch a transmission mode between a master device and a slave device.

2. Description of the Prior Art

As technology advances, mobile devices, such as smart phones and the personal digital assistants (PDA), have integrated more communication and display functions to implement various application functions. In order to deal with such various application functions, a high speed processing interface between a processer and a display panel of the mobile device is necessary to increase data transmission amounts, so as to improve the touch and resolution functions of the display panel. Under such circumstances, the leading industrial producers have provided the mobile industry processor interface (MIPI) to standardize communication among the mobile devices.

Please refer to FIG. 1, which illustrates a schematic diagram of a conventional data transmission system 10. As shown in FIG. 1, the data transmission system 10 comprises a master device 100, such as a master system microprocessor, and a slave device 120, such as a display device microprocessor. The master device 100 encodes an original packet P_Ori to be a transmission packet P_Tra and transmits the transmission packet P_Tra to the slave device 120, wherein the transmission packet P_Tra comprises an original clock packet and an original data packet. The slave device 120 receives the transmission packet P_Tra, and accordingly, decodes the transmission packet P_Tra to be the original packet P_Ori, so as to transmit the original packet P_Ori to a display device 140 for displaying. Noticeably, the MIPI comprises two kinds of transmission modes. One of the transmission modes is the low power transmission mode, and the other is the high speed transmission mode. When the master device 100 transmits a plurality of display information (i.e. the plurality of original packets) to be displayed on the display device 140 to the slave device 120, the master device 100 is operated in the high speed transmission mode. Under such circumstances, the plurality of display information is encoded to be the plurality of transmission packets P_Tra, and a differential signal transmission process is utilized for transmitting the plurality of transmission packets P_Tra to the slave device 120. When the master device 100 does not transmit the plurality of display information, the master device 100 is operated in the low power transmission mode to wait for another command of entering into the high speed transmission mode. Noticeably, the differential signal transmission process of the high speed transmission mode can increase the transmission rate between the master device 100 and the slave device 120, to effectively reduce a pin number of the master device 100 and the slave device 120, so as to comply with the operation of larger data transmission amounts.

Please refer to FIG. 2A to FIG. 2C, where FIG. 2A to FIG. 2C illustrate schematic diagrams of processing different data transmission signals between the master device 100 and the slave device 120. The transmission packet P_Tra comprises frame data D_Frame1-D_FrameN, and each of the frame data D_Frame1-D_FrameN comprises row data D_Line1-D_LineM, wherein the symbols N, M represent the resolution of the display device 140 and can be adaptively adjusted. The low power transmission mode corresponds to a high voltage pulse signal, such as 1.2 volts, and the high speed transmission mode corresponds to a low voltage pulse signal, such as 300 micro-volts. As shown in FIG. 2A to FIG. 2C, when the master device 100 and the slave device 120 are ready for transmitting the display device information, which means that the low power transmission mode is switched to the high speed transmission mode, the data transmission signals are correspondingly changed from the high voltage pulse signal to the low voltage pulse signal, so as to transmit the display device information. Accordingly, the frame data D_Frame1-D_FrameN of the transmission packet P_Tra as well as the line data D_Line1-D_LineM of each of the frame data D_Frame1-D_FrameN are transmitted via the high speed transmission mode, and the data transmission signals are represented as the low voltage pulse signal. However, FIG. 2A to FIG. 2C demonstrate different transmission processes for transmitting the display device information between the low power transmission mode and the high speed transmission mode, respectively. As shown in FIG. 2A, the signal between every two row data corresponding to the high speed transmission mode goes back to the low power transmission mode once. As shown in FIG. 2B, the signal between every two frame data corresponding to the high speed transmission mode goes back to the low power transmission mode once. As shown in FIG. 2C, once the master device 100 is operated in the high speed transmission mode, the master device 100 is switched to the low power transmission mode after transmitting all the frame data D_Frame1-D_FrameN of the transmission packet P_Tra as well as the line data D_Line1-D_LineM of each of the frame data D_Frame1-D_FrameN.

Noticeably, during processing in the low power transmission mode or in the high speed transmission mode, the master device 100 cannot monitor whether the slave device 120 correctively receives and decodes the transmission packet P_Tra. If errors occur while transmission (i.e. the transmission packet P_Tra has errors) and the master device 100 is operated in the high speed transmission mode, the user has no chances to correct the errors of the transmission packet P_Tra. Thus, the master device 100 will be switched to the low power transmission mode first, and then be operated in the high speed transmission mode again for related transmission, such that the slave device 120 can correspondingly receive the correct transmission packet P_Tra. Under such circumstances, the master device 100 may not instantaneously notice that the slave device 120 has missed partial transmission packets P_Tra, and the high speed transmission mode is still operated for transmitting the display device information. Further, if the user requires more accuracy as well as stability of transmission and operates the master device 100 to be switched between the high speed transmission mode and the low power transmission mode, a transmission amount of the transmission packet is correspondingly restricted to narrow the application range of the data transmission system 10.

Therefore, it is an important issue to provide another data transmission system and method which can adaptively switch a transmission mode between a master device and a slave device, such that an original data can be correctly received and decoded by the slave device, and in the meanwhile, the unnecessary waiting periods as well as the operational powers can be correspondingly saved during the transmission process.

SUMMARY OF THE INVENTION

Accordingly, a data transmission system and method are provided to adaptively switch a transmission mode between a master device and a slave device, such that an original data can be correctly received and decoded by the slave device, and in the meanwhile, the unnecessary waiting periods as well as the operational powers can be correspondingly saved during the transmission process.

According to an aspect of the disclosure, a data transmission system utilized in a Mobile Industry Processor Interface (MIPI) is provided to comprise a master device including a control module for generating a control signal according to a feedback signal; and a packet encoding module coupled to the control module for encoding an original packet to be a transmission packet according to the original packet and the control signal, to process a transmission operation; and a slave device including a packet decoding module for decoding the transmission packet to be the original packet or a related display device signal corresponding to the original packet to a display device; and a feedback module coupled to the packet decoding module for generating the feedback signal to the control module of the master device according to a decoding condition of the control module, so as to switch a transmission mode of the transmission operation.

According to an aspect of the disclosure, a data transmission method for a data transmission system utilized in a Mobile Industry Processor Interface (MIPI) is provided. The data transmission method comprises generating a control signal according to a feedback signal; encoding an original packet to be a transmission packet according to the original packet and the control signal, to process a transmission operation; decoding the transmission packet to be the original packet or a related display device signal corresponding to the original packet to a display device according to the transmission operation and the transmission packet; and generating the feedback signal according to a decoding condition of the transmission packet, to switch a transmission mode of the transmission operation.

These and other objectives of the present invention will no doubt become obvious to those of ordinary skill in the art after reading the following detailed description of the preferred embodiment that is illustrated in the various figures and drawings.

DETAILED DESCRIPTION

In the specification and the claim of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" or "coupled" is to mean any electrical connection in a direct manner or an indirect manner. Therefore, the description of "a first device electrically connected or coupled to a second device" is to mean that the first device is connected to the second device directly or by means of connecting through other devices or methods in an indirect manner.

Figure 1:
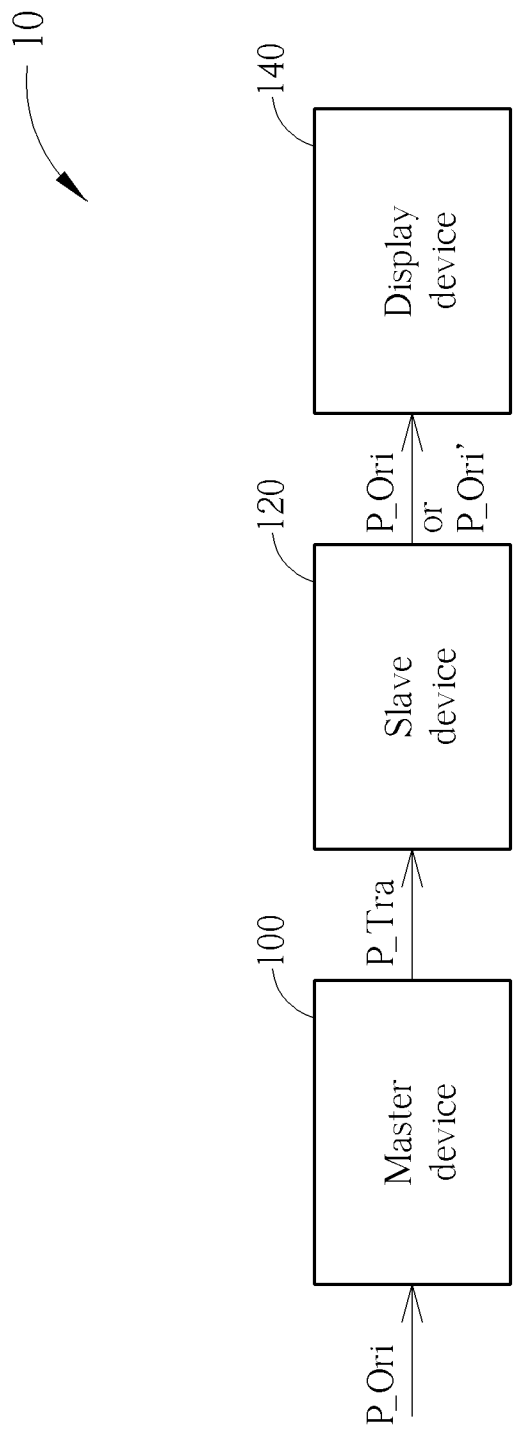
FIG. 1 illustrates a schematic diagram of a conventional data transmission system.
Figure 3:
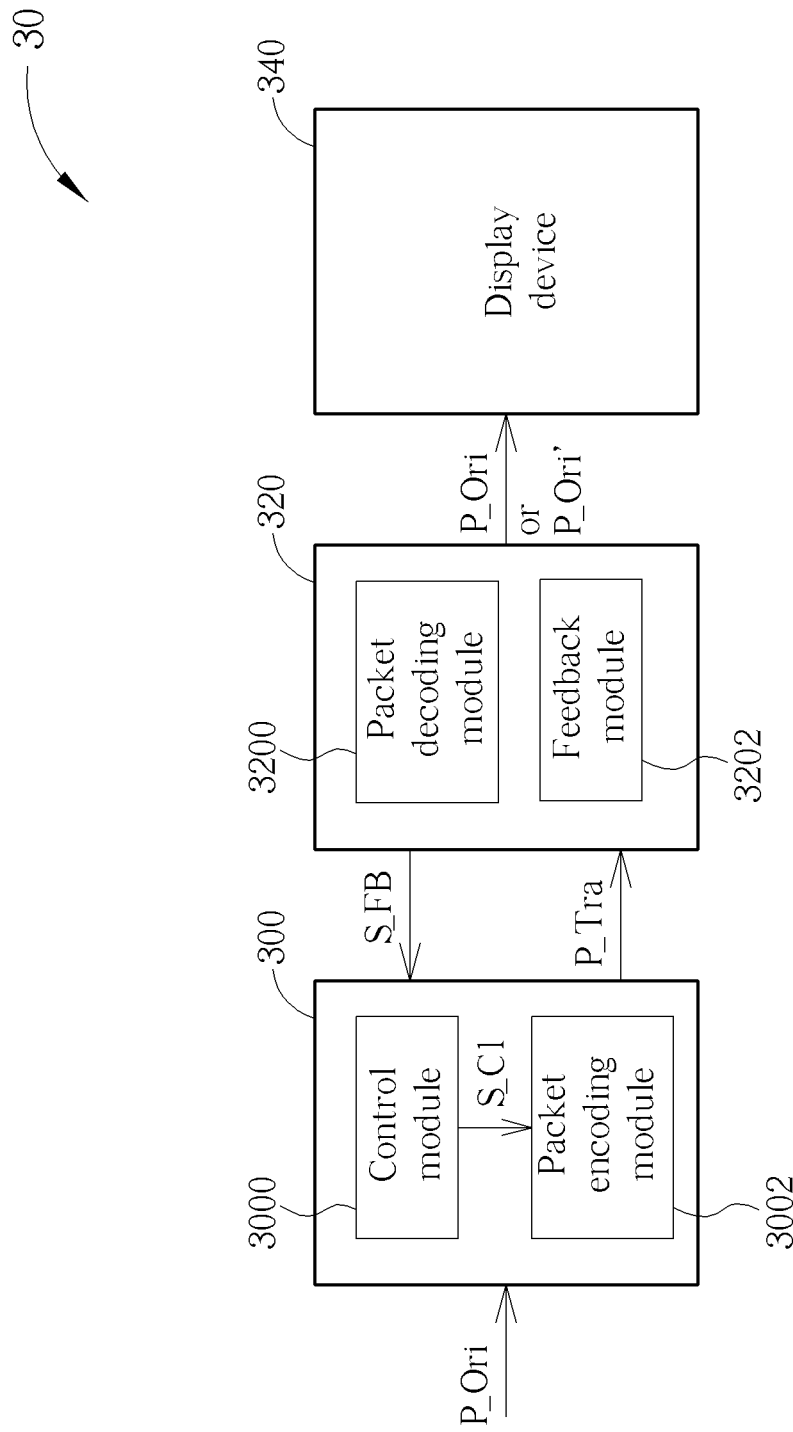
FIG. 3 illustrates a schematic diagram of a data transmission system according to an embodiment of the invention.

Please refer to FIG. 3, which illustrates a schematic diagram of a data transmission system 30 according to an embodiment of the invention. As shown in FIG. 3, the data transmission system 30 complies with the MIPI, and is similar to the data transmission system 10 shown in FIG. 1 to comprise a master device 300, a slave device 320 and a display device 340. The master device 300 is realized as a processor, and comprises a control module 3000 and a packet encoding module 3002. The control module 3000 generates a control signal S_C1 according to a command from the user or a feedback signal S_FB. The packet encoding module 3002 receives the original packet P_Ori, and correspondingly encodes the original packet P_Ori to be the transmission packet P_Tra according to the control signal S_C1, so as to transmit the transmission packet P_Tra to the slave device 320. The slave device 320 is realized as a liquid crystal display (LCD) driving chip, and comprises a packet decoding module 3200 and a feedback module 3202. The packet decoding module 3200 receives the transmission packet P_Tra, and correspondingly decodes the transmission packet P_Tra to be the original packet P_Ori or a related display device signal P_Ori' corresponding to the original packet, so as to transmit the original packet P_Ori or the related display device signal P_Ori' thereof to the display device 340. The related display device signal P_Ori' is a gate signal, a source signal or a common voltage level signal, and is not limited in the scope of the invention. The feedback module 3202 transmits the feedback signal S_FB to the control module 3000 of the master device 300 according to a decoding condition of the packet decoding module 3200. Accordingly, the master device 300 can monitor whether the slave device 320 correctly receives and decodes the original packet P_Ori according to the feedback signal S_FB, to switch a transmission mode of the transmission operation between the master device 300 and the slave device 320.

Preferably, the original packet P_Ori corresponds to an imaging data to be transmitted in the data transmission system 30 utilizing the MIPI, such that the data transmission system 30 can be correctively switched between the low power transmission mode and the high speed transmission mode, and the display device 340 can correctively display a high resolution imaging data. Noticeably, the slave device 320 and the display device 340 are demonstrated as independent block diagrams, and those skilled in the art can adaptively integrate the slave device 320 (such as the LCD driving chip) with the display device 340, to make the master device 300 directly share the display data with the display device 340, which is not limiting the scope of the invention. Additionally, the original packet P_Ori comprises a plurality of frame data, and each of the frame data comprises a plurality of row data. Further, each of the plurality of frame data corresponds to a frame data synchronizing signal, and each of the plurality of row data corresponds to a row data synchronizing signal. Thus, the data transmission system 30 can correctively transmit the original packet P_Ori, and the display device 340 can precisely display the original data P_Ori corresponding to the imaging data.

Furthermore, if the slave device 320 comprises a storage module (not shown in the figure), a command mode transmission process is operated between the master device 300 and the slave device 320. If the slave device 320 does not comprise a storage module, a video mode transmission process is operated between the master device 300 and the slave device 320. Preferably, the transmission packet P_Tra further comprises a predetermined written packet format, such as 0X2C, while the command mode transmission process is operated. Certainly, those skilled in the art can utilize other transmission packet formats utilized in the MIPI to be cooperated with the predetermined written packet format, such as 0X2C, of the invention, which is not limiting the scope of the invention.

Simply, if the data transmission system 30 of the invention utilizes the video mode transmission process, the master device 300 encodes the original packet P_Ori to be the transmission packet P_Tra. Accordingly, the slave device 320 receives and decodes the transmission packet P_Tra to be the original packet P_Ori or the related display device signal P_Ori' in the high speed transmission mode, so as to transmit the original packet P_Ori to the display device 340. If the slave device 320 correctly decodes the transmission packet P_Tra to be the original packet P_Ori, the slave device 320 dynamically transmits the feedback signal S_FB to the master device 300 according to the decoding condition, wherein the feedback signal S_FB further comprises a synchronizing signal (not shown in the figure) to instruct the control module 3000 of the master device 300 not to switch the transmission mode between the master device 300 and the slave device 320, which means the master device 300 is not switched from the high speed transmission mode to the low power transmission mode and the high speed transmission mode is still utilized. On the other side, if the slave device 320 does not correctly decode the transmission packet P_Tra, the synchronizing signal is not generated and thus the feedback signal S_FB does not comprise the synchronization signal, and in this situation, the control module 3000 will switch the transmission mode between the master device 300 and the slave device 320, which means that the master device 300 is switched from the high speed transmission mode to the low power transmission mode.

Figure 2A:
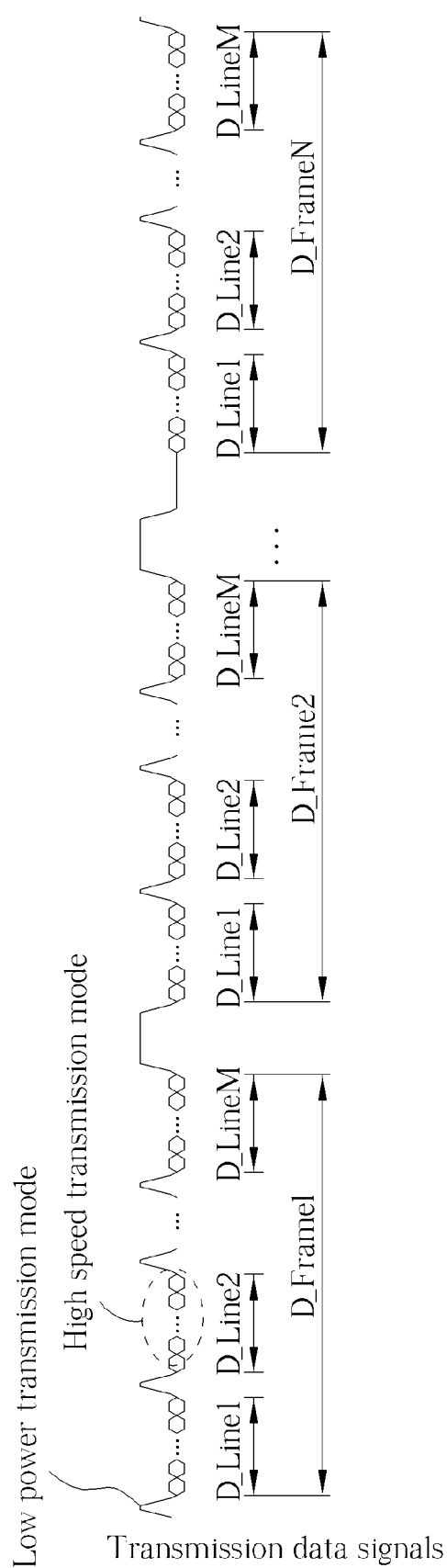
FIG. 2A to FIG. 2C illustrate schematic diagrams of processing different data transmission signals between the master device and the slave device in the prior art.
Figure 2B:
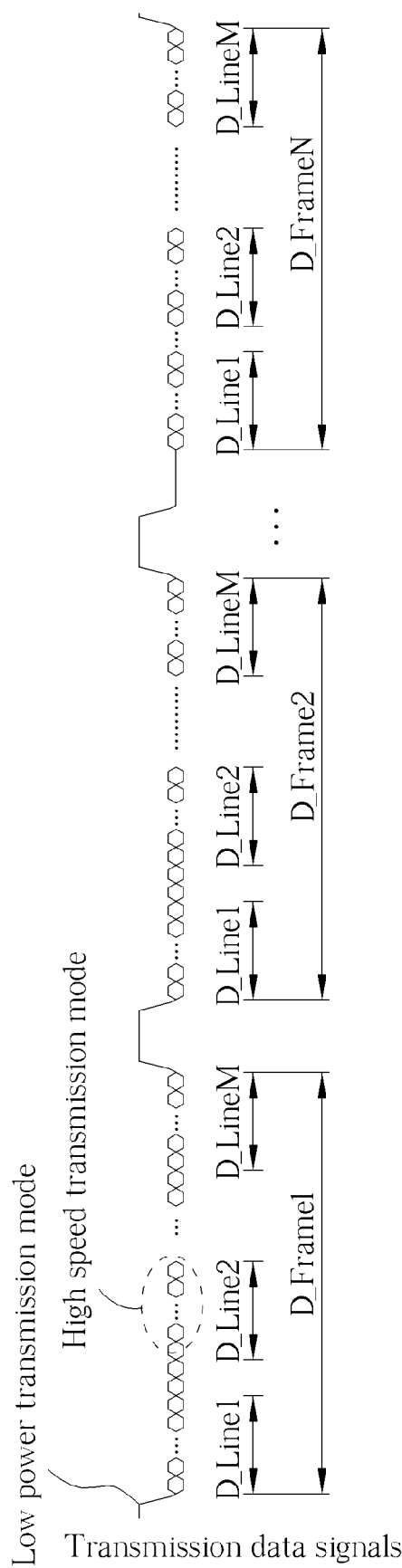
Figure 2C:
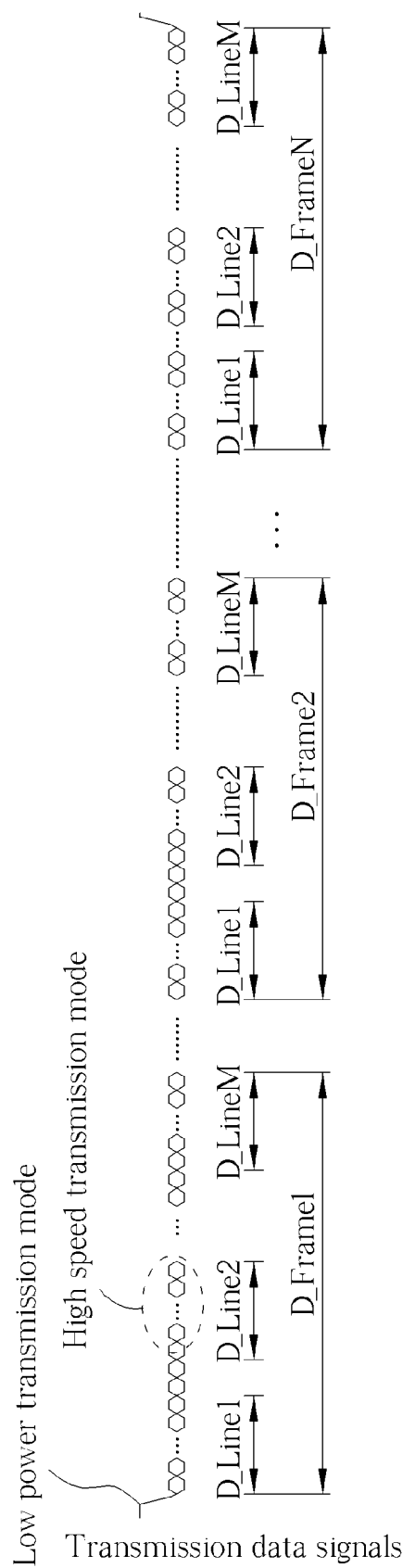
Figure 4:
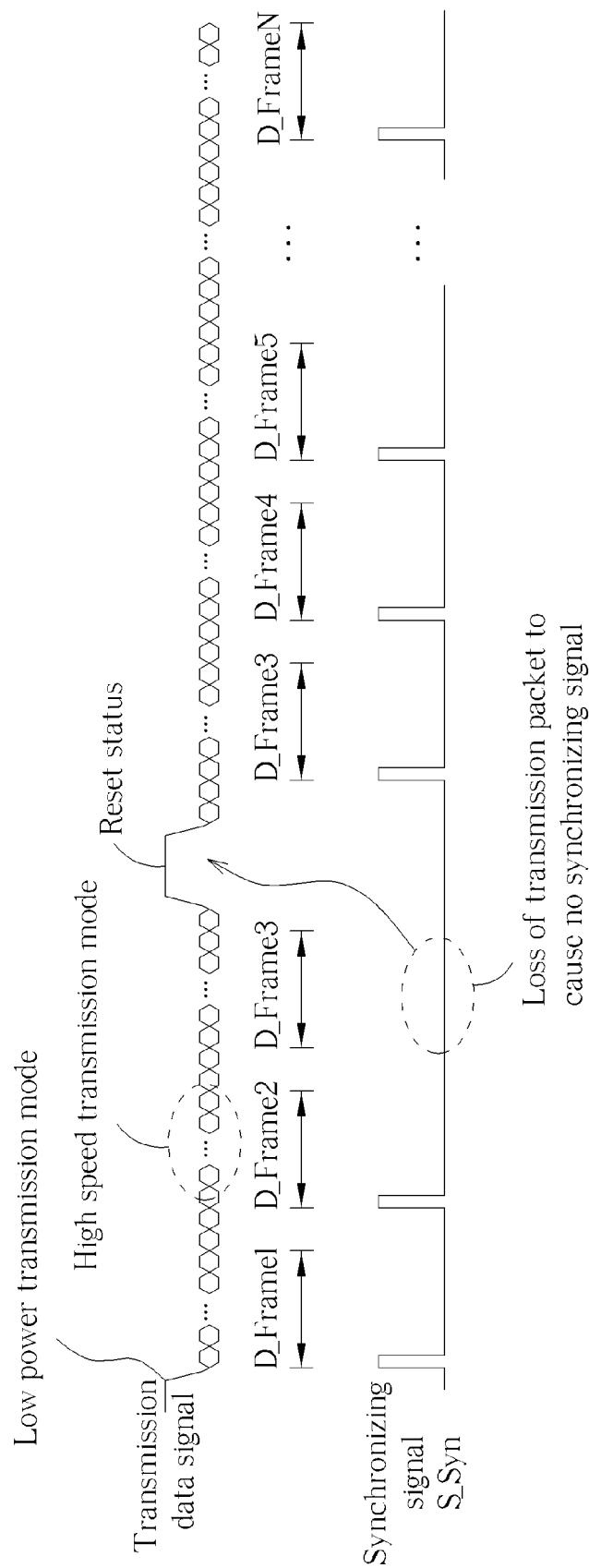
FIG. 4 illustrates a schematic diagram of the data transmission signals of the data transmission system shown in FIG. 3.

Please refer to FIG. 4, which illustrates a schematic diagram of the data transmission signals of the data transmission system 30 shown in FIG. 3. As shown in FIG. 4, the frame data D_Frame1-D_FrameN of the transmission packet P_Tra and the row data of each of the frame data D_Frame1-D_FrameN, which are similar to the prior art shown in FIG. 2A to FIG. 2C, are transmitted via the high speed transmission mode and correspond to low voltage pulse signals. Besides, the synchronizing signal S_Syn in the feedback signal S_FB is also generated by the slave device 320 shown in the figure. When the slave device 320 successfully receives the transmission packet P_Tra (or when the transmission packet P_Tra has decoded to be the original packet P_Ori), the feedback module 3202 periodically transmits the synchronizing signal S_Syn to the master device 300, to inform the master device 300 of continuously transmitting via the high speed transmission mode. However, when the slave device 320 does not correctly receive the transmission packet P_Tra, such as the third frame data D_Frame3 in FIG. 4, the feedback module 3202 will not generate the synchronizing signal S_Syn. Under such circumstances, the control module 3000 will switch to the low power transmission mode while the master device 300 fails to receive the synchronizing signal S_Syn, and a reset status is correspondingly generated, as shown in FIG. 4. After a predetermined waiting period, the master device 300 generates the control signal S_C1 via the control module 3000 and switches to the high speed transmission mode, to transmit the plurality of display data between the master device 300 and the slave device 320.

Figure 5:
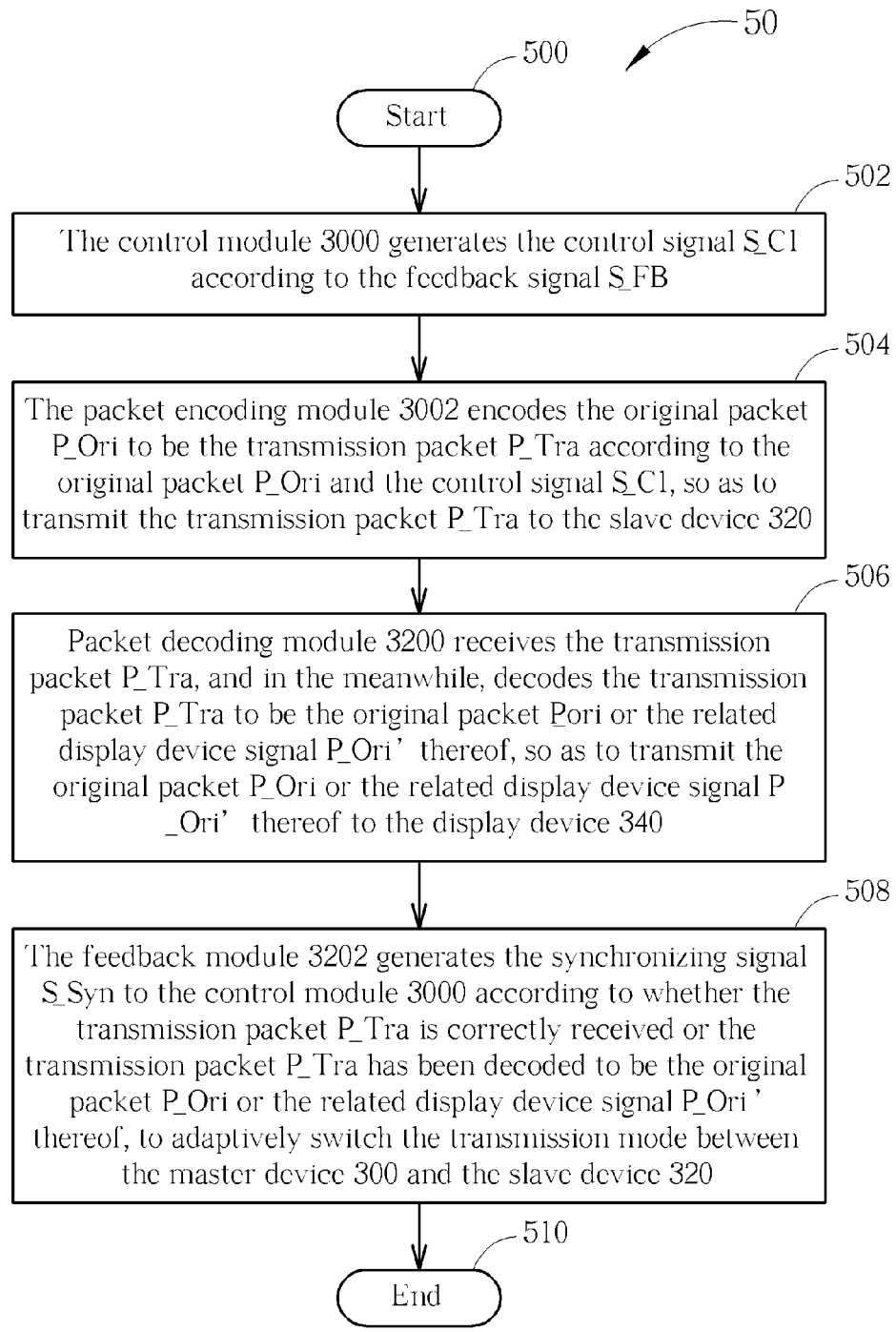
FIG. 5 illustrates a flow chart of a data transmission process according to an embodiment of the invention.

Operations of the data transmission system 30 of the invention can be summarized as a data transmission process 50, as shown in FIG. 5. The data transmission process 50 includes the following steps:

Step 500: Start.

Step 502: The control module 3000 generates the control signal S_C1 according to the feedback signal S_FB.

Step 504: The packet encoding module 3002 encodes the original packet P_Ori to be the transmission packet P_Tra according to the original packet P_Ori and the control signal S_C1, so as to transmit the transmission packet P_Tra to the slave device 320.

Step 506: Packet decoding module 3200 receives the transmission packet P_Tra, and in the meanwhile, decodes the transmission packet P_Tra to be the original packet P_ori or the related display device signal P_Ori' thereof, so as to transmit the original packet P_Ori or the related display device signal P_Ori' thereof to the display device 340.

Step 508: The feedback module 3202 generates the synchronizing signal S_Syn to the control module 3000 according to whether the transmission packet P_Tra is correctly received or the transmission packet P_Tra has been decoded to be the original packet P_Ori or the related display device signal P_Ori' thereof, to adaptively switch the transmission mode between the master device 300 and the slave device 320.

Step 510: End.

Detailed operations of each of the steps of the data transmission process 50 can be understood via the embodiments shown in FIG. 3 to FIG. 4 and related paragraphs thereof, and are not described here for brevity. Noticeably, detailed operations of step 508 can arbitrarily combine the two determination mechanisms as whether the packet decoding module 3200 correctly receives the transmission packet P_Tra or whether the packet decoding module 3200 has decoded the transmission packet P_Tra to be the original packet P_Ori or the related display device signal P_Ori' thereof, to determine whether or not to generate the synchronizing signal S_Syn. Certainly, those skilled in the art can add other determination mechanisms for determining whether the synchronizing signal S_Syn is correspondingly generated while the slave device 320 correctly receives the transmission packet P_Tra in the high speed transmission mode, which is also in the scope of the invention.

Figure 6:
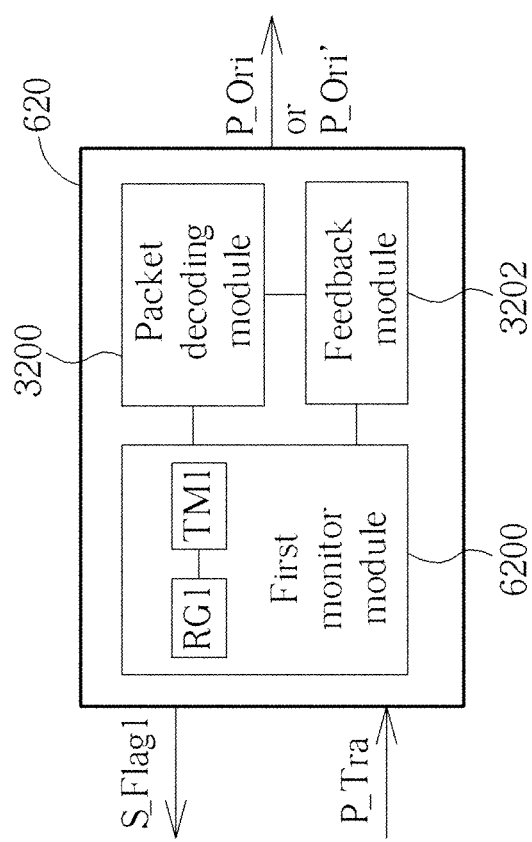
FIG. 6 illustrates another schematic diagram of another slave device in the data transmission system shown in FIG. 3.

Please refer to FIG. 6, which illustrates another schematic diagram of another slave device 620 in the data transmission system 30 shown in FIG. 3. The slave device 620 can replace the slave device 320, and the data transmission system 30 comprising the slave device 620 can be utilized in the video mode transmission process as well. In comparison with the slave device 320 shown in FIG. 3, the slave device 620 shown in FIG. 6 further comprises a first monitor module 6200 coupled between the packet decoding module 3200 and the feedback module 3202. The first monitor module 6200 comprises a register RG1 and a timer TM1. The timer TM1 generates a flag signal S_Flag1, and the register RG1 stores the synchronizing signal S_Syn generated by the feedback module 3202 and drives the timer TM1 entering a timing operation. The timer TM1 monitors whether the register RG1 continuously stores the synchronizing signal S_Syn in a predetermined period of the timing operation, to correspondingly adjust signal changes of the flag signal S_Flag1 to be transmitted to the master device 300.

Figure 7:
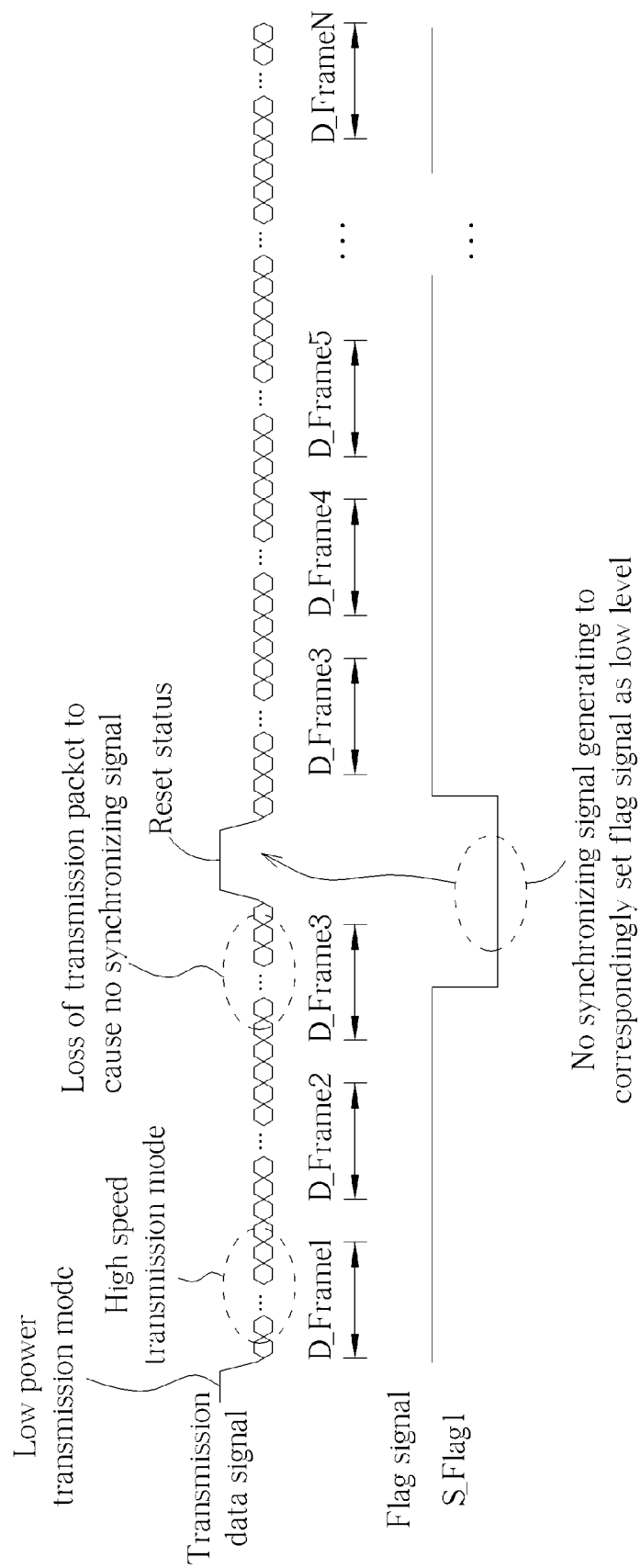
FIG. 7 illustrates a schematic diagram of the data transmission signals accompanying with the flag signal of the slave device in FIG. 6.

Please refer to FIG. 7, which illustrates a schematic diagram of the data transmission signals accompanying with the flag signal S_Flag1 of the slave device 620 in FIG. 6. As shown in FIG. 6 and FIG. 7, when the slave device 620 successfully receives the transmission packet P_Tra (or when the transmission packet P_Tra has correctly decoded to be the original packet P_Ori or the related display device signal P_Ori' thereof), the feedback module 3202 continuously generates the synchronizing signal S_Syn stored in the register RG1, and drives the timer TM1 to set the flag signal S_Flag1 as a high level, so as to transmit the flag signal S_Flag1 to the master device 300. Accordingly, the master device 300 utilizes the high speed transmission mode for the related transmission. Since the slave device 320 fails to correctly receive the third frame data D_Frame3, the feedback module 3202 will not correspondingly generate the synchronizing signal S_Syn. When the timer TM1 determines that the register RG1 does not store the synchronizing signal S_Syn in the predetermined period, the flag signal S_Flag1 is correspondingly set to be a low level and transmitted to the master device 300, such that the master device 300 can switch to the low power transmission mode to enter the reset status. After the predetermined period, the master device 300 can generate the control signal S_C1 via the control module 3000, to correspondingly switch to the high speed transmission mode, so as to transmit the plurality of display data between the maser device 300 and the slave device 320. Under such circumstances, when the register RG1 has stored the synchronizing signal S_Syn in the predetermined period, the timer TM1 will set the flag signal S_Flag1 to be the high level and the master device 300 will process the transmission with the high speed transmission mode.

Figure 8:
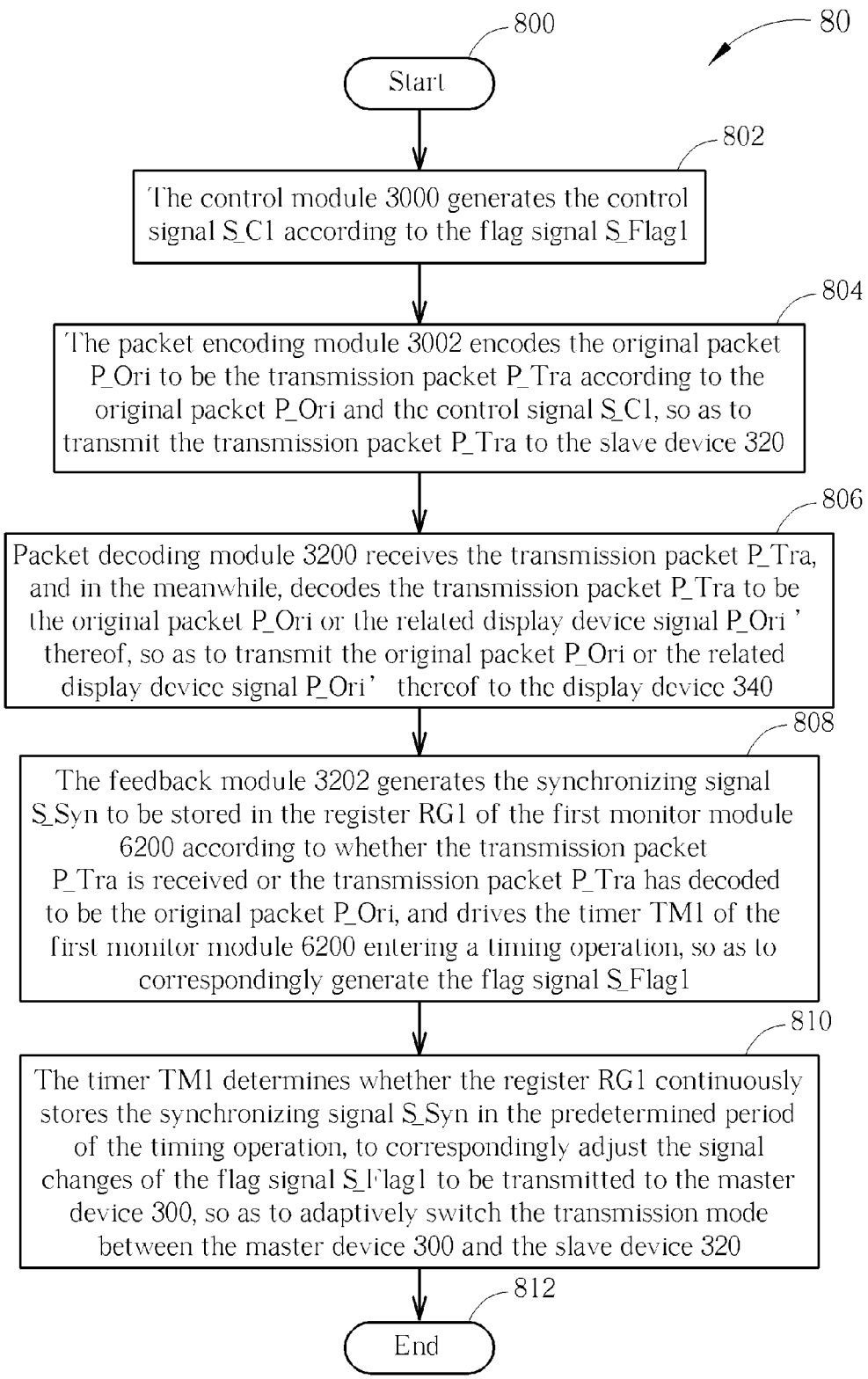
FIG. 8 illustrates a flow chart of another data transmission process according to an embodiment of the invention.

Further, operations of the data transmission system 30 utilizing the slave device 620 of the invention can be summarized as another data transmission process 80, as shown in FIG. 8. The data transmission process 80 includes the steps as follows:

Step 800: Start.

Step 802: The control module 3000 generates the control signal S_C1 according to the flag signal S_Flag1.

Step 804: The packet encoding module 3002 encodes the original packet P_Ori to be the transmission packet P_Tra according to the original packet P_Ori and the control signal S_C1, so as to transmit the transmission packet P_Tra to the slave device 320.

Step 806: Packet decoding module 3200 receives the transmission packet P_Tra, and in the meanwhile, decodes the transmission packet P_Tra to be the original packet P_Ori or the related display device signal P_Ori' thereof, so as to transmit the original packet P_Ori or the related display device signal P_Ori' thereof to the display device 340.

Step 808: The feedback module 3202 generates the synchronizing signal S_Syn to be stored in the register RG1 of the first monitor module 6200 according to whether the transmission packet P_Tra is received or the transmission packet P_Tra has decoded to be the original packet P_Ori, and drives the timer TM1 of the first monitor module 6200 entering a timing operation, so as to correspondingly generate the flag signal S_Flag1.

Step 810: The timer TM1 determines whether the register RG1 continuously stores the synchronizing signal S_Syn in the predetermined period of the timing operation, to correspondingly adjust the signal changes of the flag signal S_Flag1 to be transmitted to the master device 300, so as to adaptively switch the transmission mode between the master device 300 and the slave device 320.

Step 812: End.

Detailed operations of each of the steps of the data transmission process 80 can be understood via the embodiments shown in FIG. 3 to FIG. 6 and related paragraphs thereof, and are not described here for brevity. Noticeably, those skilled in the art can adaptively modify/change a generation timing of the signal changes between the high level and the low level related to the flag signal S_Flag1 in step 810 according to different requirements, and the slave device 620 can add other determination mechanisms, which are similar to the flag signals S_Flag1 transmitted to the master device 300, to correspondingly switch the transmission mode between the high speed transmission mode and the low power transmission mode, which is also in the scope of the invention.

Figure 9:
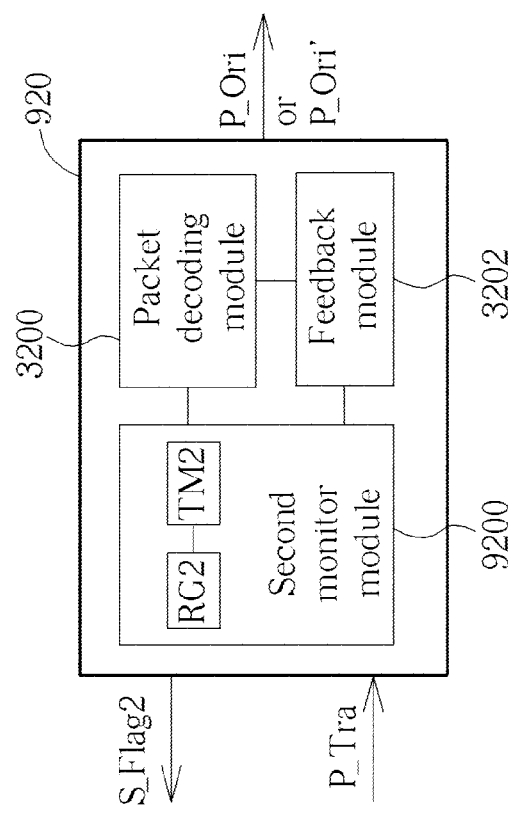
FIG. 9 illustrates another schematic diagram of another slave device in the data transmission system shown in FIG. 3.

Please refer to FIG. 9, which illustrates another schematic diagram of another slave device 920 in the data transmission system 30 shown in FIG. 3. The slave device 920 can replace the slave device 320, and the data transmission system 30 comprising the slave device 920 can be utilized in the command mode transmission process. As shown in FIG. 9, the slave device 920 further comprises a second monitor module 9200 coupled between the packet decoding module 3200 and the feedback module 3202. In comparison with the slave device 620 shown in FIG. 6, the second monitor module 9200 is utilized to monitor whether the predetermined written packet format 0X2C is inside the received transmission packet P_Tra of the packet decoding module 3200, and the second monitor module 9200 also comprises a register RG2 and a timer TM2, wherein the timer TM2 generates a flag signal S_Flag2. The register RG2 correspondingly stores the predetermined written packet format 0X2C, and drives the timer TM2 to enter a timing operation. The timer TM2 monitors whether the register RG2 continuously stores the predetermined written packet format 0X2C in a predetermined period of the timing operation, to correspondingly adjust signal changes of the flag signal S_Flag2 to be transmitted to the master device 300. Similar to FIG. 7, when the slave device 920 successfully receives the transmission packet P_Tra, which comprises the predetermined written packet format 0X2C, being stored in the register RG2, the packet decoding module 3200 will drive the timer TM2 to set the flag signal SFlag2 to be the high level, so as to transmit the flag signal S_Flag2 to the master device 300 to instruct the master device 300 for continuously transmitting via the high speed transmission mode. However, when the register RG2 does not store the synchronizing signal S_Syn in the predetermined period, the timer TM2 will set the flag signal S_Flag2 to be the low level to be transmitted to the master device 300, so as to switch the transmission mode of the master device 300.

Figure 10:
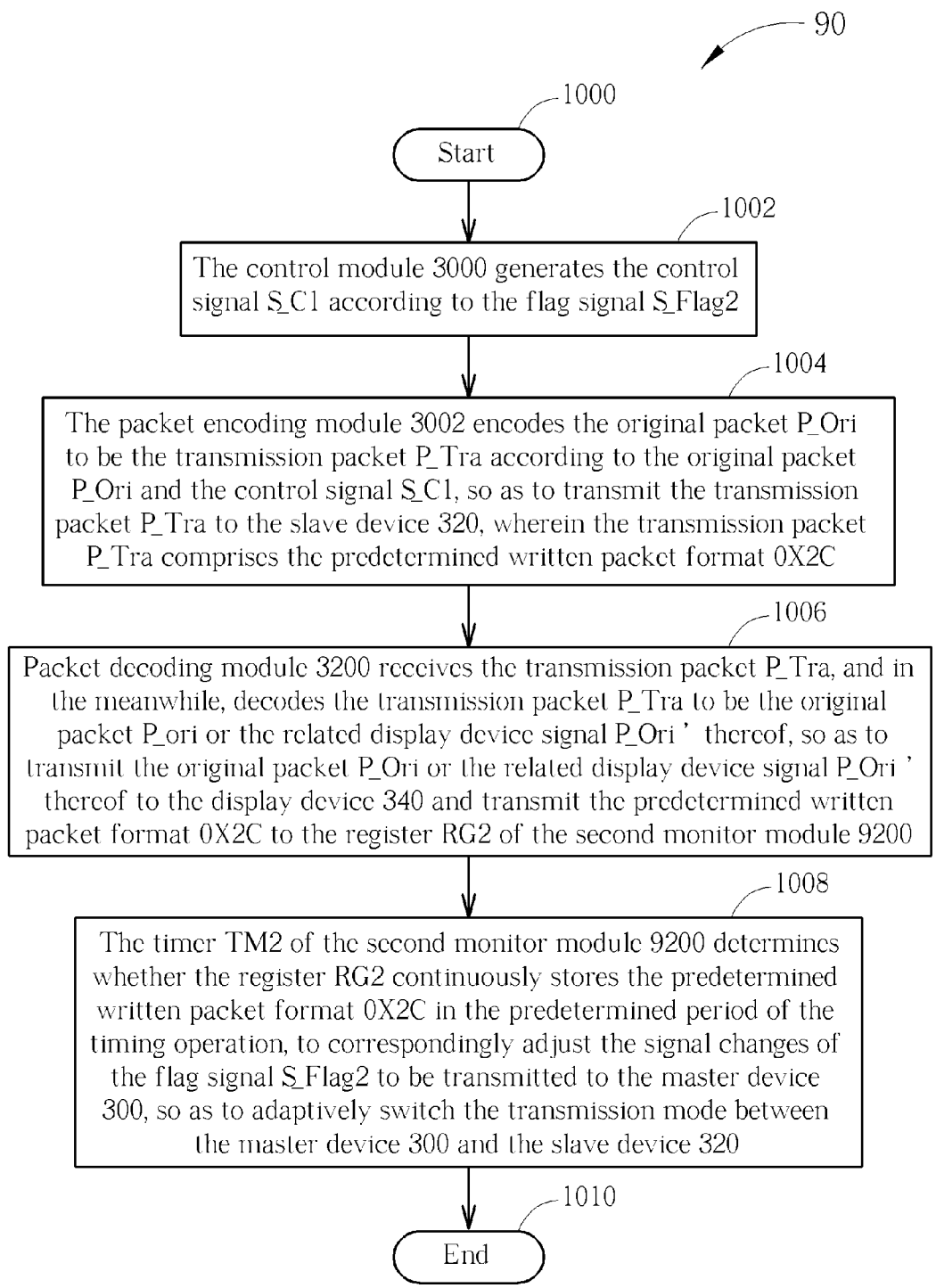
FIG. 10 illustrates a flow chart of another data transmission process according to an embodiment of the invention.

Further, operations of the data transmission system 30 utilizing the slave device 920 of the invention can be summarized as another data transmission process 90, as shown in FIG. 10. The data transmission process 90 includes the steps as follows:

Step 1000: Start.

Step 1002: The control module 3000 generates the control signal S_C1 according to the flag signal S_Flag2.

Step 1004: The packet encoding module 3002 encodes the original packet P_Ori to be the transmission packet P_Tra according to the original packet P_Ori and the control signal S_C1, so as to transmit the transmission packet P_Tra to the slave device 320, wherein the transmission packet P_Tra comprises the predetermined written packet format 0X2C.

Step 1006: Packet decoding module 3200 receives the transmission packet P_Tra, and in the meanwhile, decodes the transmission packet P_Tra to be the original packet P_ori or the related display device signal P_Ori' thereof, so as to transmit the original packet P_Ori or the related display device signal P_Ori' thereof to the display device 340 and transmit the predetermined written packet format 0X2C to the register RG2 of the second monitor module 9200.

Step 1008: The timer TM2 of the second monitor module 9200 determines whether the register RG2 continuously stores the predetermined written packet format 0X2C in the predetermined period of the timing operation, to correspondingly adjust the signal changes of the flag signal S_Flag2 to be transmitted to the master device 300, so as to adaptively switch the transmission mode between the master device 300 and the slave device 320.

Step 1010: End.

Detailed operations of each of the steps of the data transmission process 90 can be understood via the embodiments shown in FIG. 3 to FIG. 9 and related paragraphs thereof, and are not described here for brevity. Noticeably, those skilled in the art can adaptively modify/change a generation timing of the signal changes between the high level and the low level related to the flag signal S_Flag2 in step 1008 according to different requirements, or modify/change the predetermined written packet format 0X2C of the invention to comply with general transmission packets utilized in the MIPI. Also, step 1008 can cooperate with the switch mechanisms of the synchronizing signal S_Syn in the data transmission processes 50, 80, to provide the data transmission system 30 comprising the slave device 920 with the flag signal S_Flag and the synchronizing signal S_Syn, so as to switch the master device 300 to be operated between the high speed transmission mode and the low power transmission mode, which is also in the scope of the invention.

Figure 11:
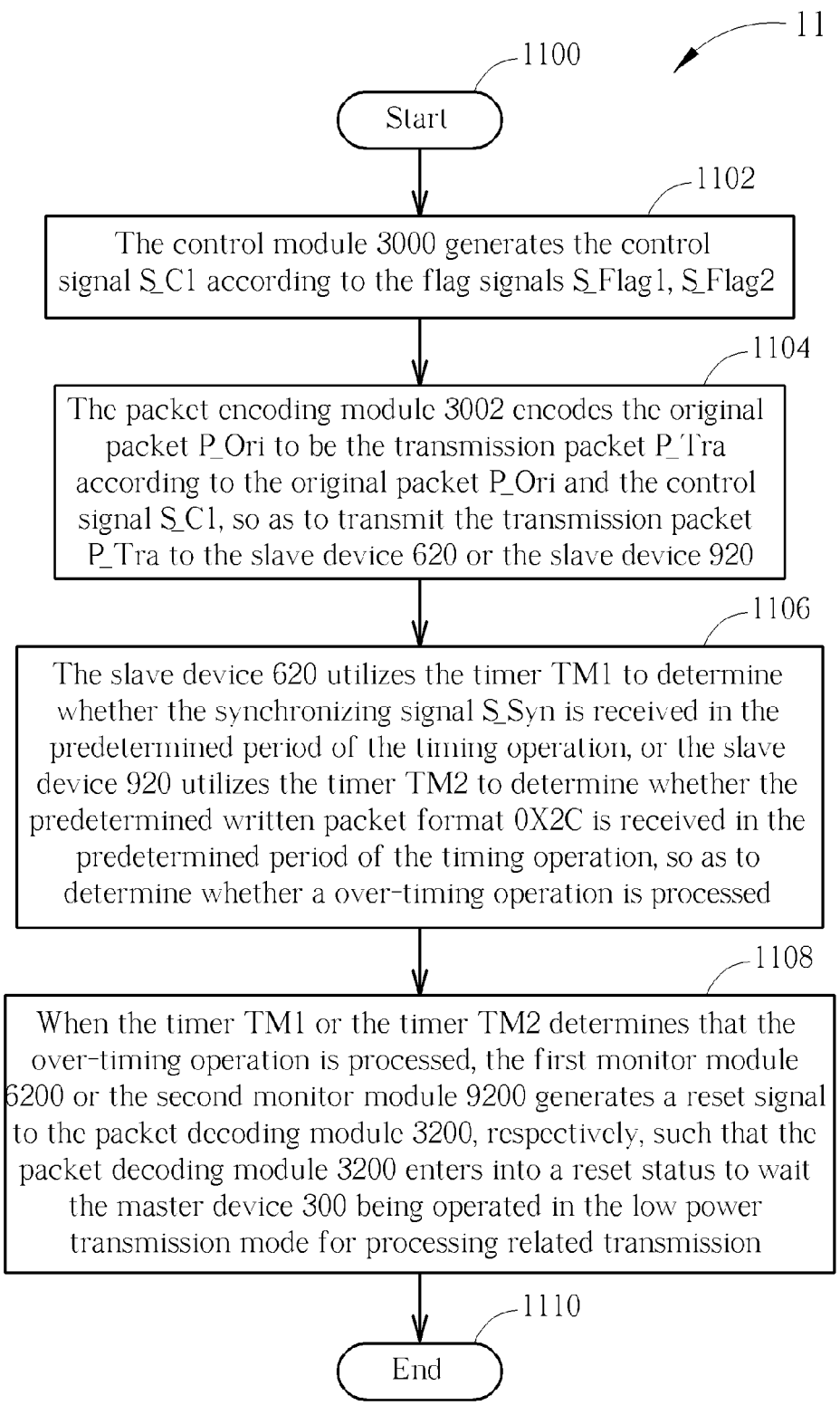
FIG. 11 illustrates a flow chart of another data transmission process according to an embodiment of the invention.

Please refer to FIG. 11, which illustrates a flow chart of another data transmission process 11 according to an embodiment of the invention, wherein the data transmission process 11 is utilized for the data transmission system 30 comprising the slave device 620 or the slave device 920, and can be operated in the video mode transmission process or the command mode transmission process. As shown in FIG. 11, the data transmission process 11 includes the steps as following:

Step 1100: Start.

Step 1102: The control module 3000 generates the control signal S_C1 according to the flag signals S_Flag1, S_Flag2.

Step 1104: The packet encoding module 3002 encodes the original packet P_Ori to be the transmission packet P_Tra according to the original packet P_Ori and the control signal S_C1, so as to transmit the transmission packet P_Tra to the slave device 620 or the slave device 920.

Step 1106: The slave device 620 utilizes the timer TM1 to determine whether the synchronizing signal S_Syn is received in the predetermined period of the timing operation, or the slave device 920 utilizes the timer TM2 to determine whether the predetermined written packet format 0X2C is received in the predetermined period of the timing operation, so as to determine whether a over-timing operation is processed.

Step 1108: When the timer TM1 or the timer TM2 determines that the over-timing operation is processed, the first monitor module 6200 or the second monitor module 9200 generates a reset signal to the packet decoding module 3200, respectively, such that the packet decoding module 3200 enters into a reset status to wait the master device 300 being operated in the low power transmission mode for processing related transmission.

Step 1110: End.

As mentioned in step 1106 of the data transmission process 11, the over-timing operation corresponds to the situation while the flag signal S_Flag1 or the flag signal S_Flag2 changes from the high level to the low level, and accordingly, the first monitor module 6200 or the second monitor module 9200 generates the reset signal (not shown in the figure), such that the packet decoding module 3200 enter into the reset status for waiting another new imaging data and the master device 300 returns to the low power transmission mode for processing related transmission. Preferably, the master device 300 of the invention utilizes the data transmission signal shown in FIG. 2A or FIG. 2B, to return to the low power transmission mode once when transmitting every two row data or every two frame data (i.e. corresponding to the high speed transmission mode). Accordingly, the master device 300 will not instantaneously monitor the flag signals S_Flag1, S_Flag2 transmitted from the slave devices 620, 920, and more operations of the data transmission system 30 can be applied to the display device 340.

Figure 12:
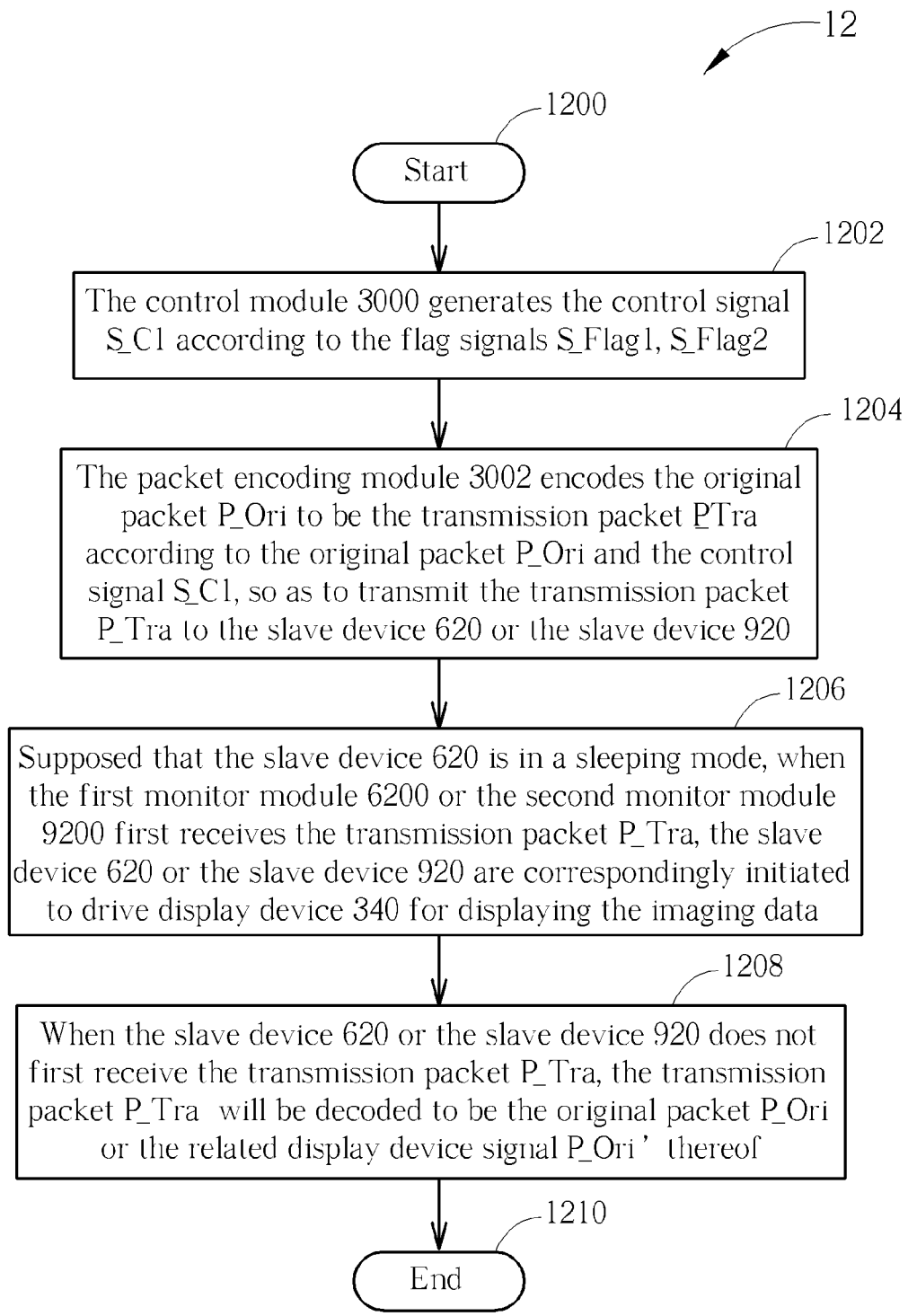
FIG. 12 illustrates a flow chart of another data transmission process according to an embodiment of the invention.

Please refer to FIG. 12, which illustrates a flow chart of another data transmission process 12 according to an embodiment of the invention, wherein the data transmission process 12 is utilized for the data transmission system 30 comprising the slave device 620 or the slave device 920, and can be operated in the video mode transmission process or the command mode transmission process. As shown in FIG. 12, the data transmission process 12 includes the following steps:

Step 1200: Start.

Step 1202: The control module 3000 generates the control signal S_C1 according to the flag signals S_Flag1, S_Flag2.

Step 1204: The packet encoding module 3002 encodes the original packet P_Ori to be the transmission packet P_Tra according to the original packet P_Ori and the control signal S_C1, so as to transmit the transmission packet P_Tra to the slave device 620 or the slave device 920.

Step 1206: Supposed that the slave device 620 is in a sleeping mode, when the first monitor module 6200 or the second monitor module 9200 first receives the transmission packet P_Tra, the slave device 620 or the slave device 920 are correspondingly initiated to drive display device 340 for displaying the imaging data.

Step 1208: When the slave device 620 or the slave device 920 does not first receive the transmission packet P_Tra, the transmission packet P_Tra will be decoded to be the original packet P_Ori or the related display device signal P_Ori' thereof.

Step 1210: End.

As mentioned in step 1204 of the data transmission process 12, when the first monitor module 6200 or the second monitor module 9200 first receives the transmission packet P_Tra, the slave device 620 or the slave device 920 are correspondingly initiated (or correspondingly generate a initiation signal to the display device 340) to drive the display device 340 for displaying the imaging data. Detailed operations of other steps in data transmission process 12 can be referenced from the data transmission process 11, which is not described here for brevity. Thus, via combining the data transmission process 11 as well as the data transmission process 12, the embodiment of the invention provides more operations for the data transmission system 30 to be applied to the display device 340.

Figure 13:
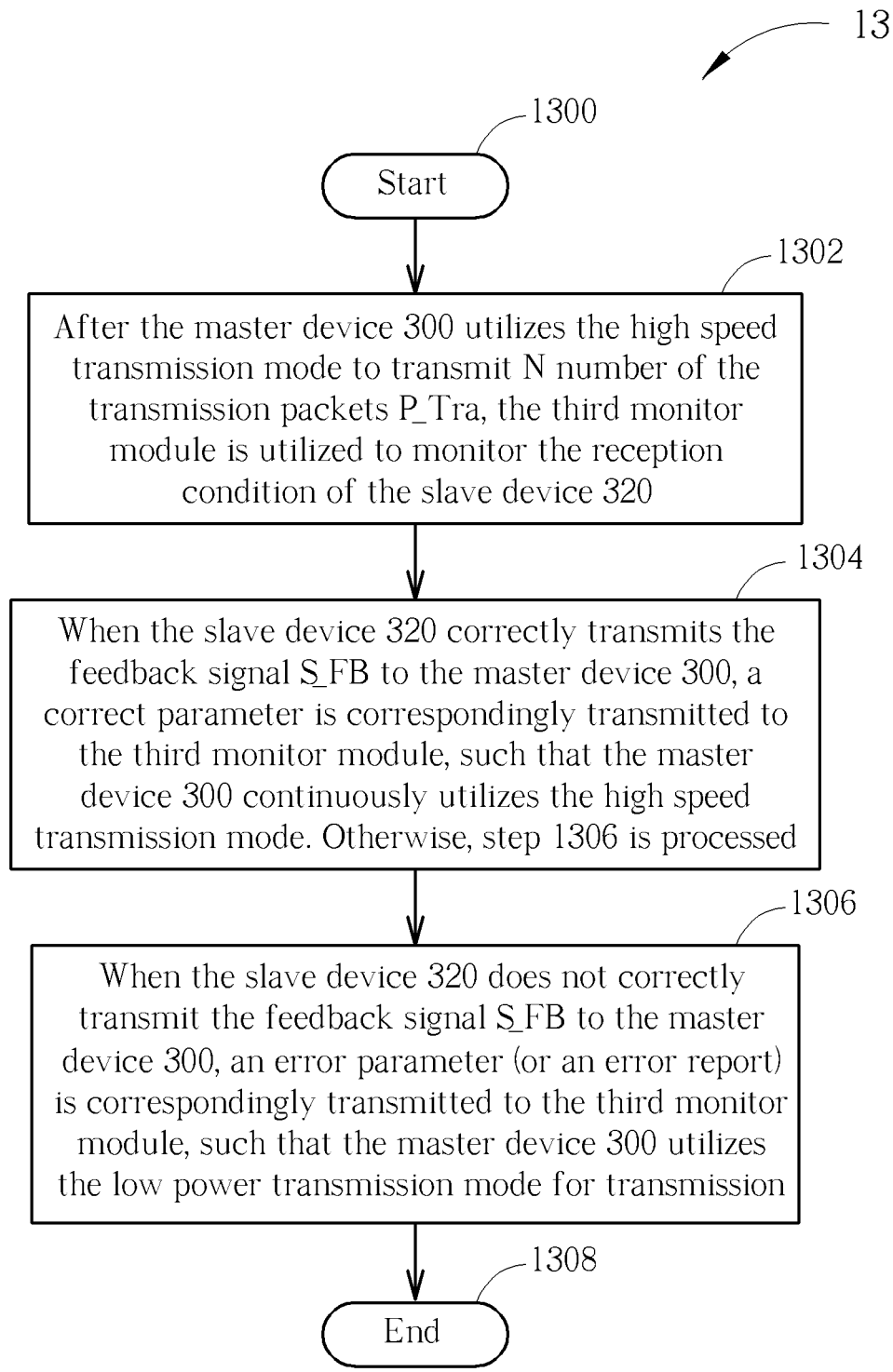
FIG. 13 illustrates a flow chart of a BTA process for the data transmission system shown in FIG. 3.

As shown in FIG. 3, the master device 300 further utilizes a bus turn around (BTA) process, and comprises a third monitor module (not shown in the figure) to instantaneously monitor a reception condition of the slave device 320, so as to determine whether the high speed transmission mode or the low power transmission mode is utilized between the master device 300 and the slave device 320 in the video mode transmission operation. For example, please refer to FIG. 13, which illustrates a flow chart of a BTA process 13 for the data transmission system 30 shown in FIG. 3. As shown in FIG. 13, the BTA process 13 includes the steps as follows:

Step 1300: Start.

Step 1302: After the master device 300 utilizes the high speed transmission mode to transmit N number of the transmission packets P_Tra, the third monitor module is utilized to monitor the reception condition of the slave device 320.

Step 1304: When the slave device 320 correctly transmits the feedback signal S_FB to the master device 300, a correct parameter is correspondingly transmitted to the third monitor module, such that the master device 300 continuously utilizes the high speed transmission mode. Otherwise, step 1306 is processed.

Step 1306: When the slave device 320 does not correctly transmit the feedback signal S_FB to the master device 300, an error parameter (or an error report) is correspondingly transmitted to the third monitor module, such that the master device 300 utilizes the low power transmission mode for transmission.

Step 1308: End.

Noticeably, in step 1304 or 1306 of the BTA process 13, the third monitor module of the master device 300 utilizes the correct parameter, the error parameter or the error report transmitted from the slave device 320 to switch the transmission mode between the master device 300 and the slave device 320. Those skilled in the art can also integrate the BTA process 13 with the data transmission process 50 to simultaneously utilize the feedback signal S_FB and the mentioned parameter/report, so as to provide more operations for the data transmission system 30 to be applied to the display device 340. Besides, the N number of the transmission packets P_Tra mentioned in step 1302 can also be adjusted according to different requirements, and is not limiting the scope of the invention.

Figure 14:
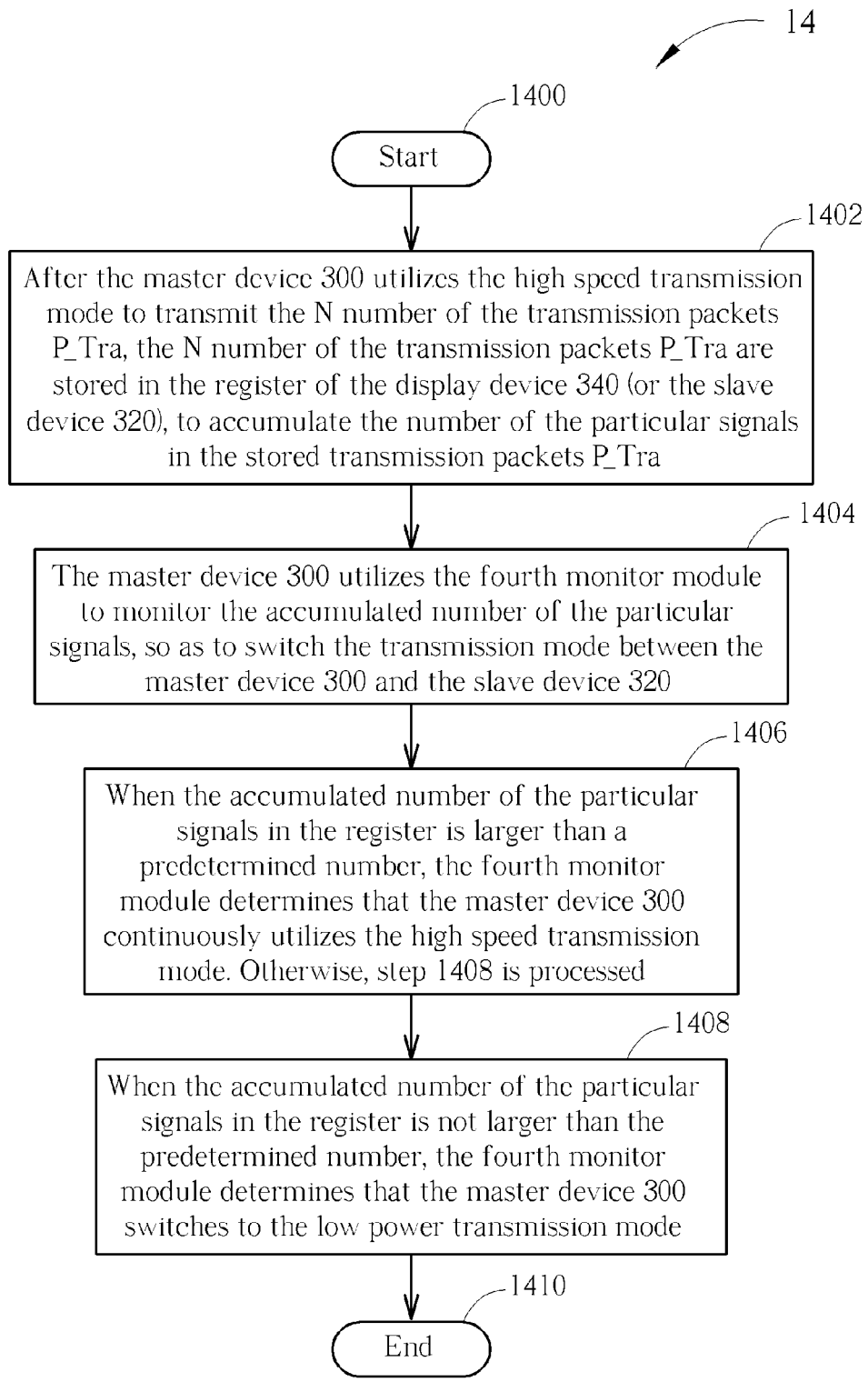
FIG. 14 illustrates a flow chart of a monitor process for the data transmission system shown in FIG. 3.

Furthermore, the display device 340 or the slave device 320, as shown in FIG. 3, can also comprise a register (not shown in the figure) to correspondingly store the transmission packet P_Tra from the master device 300, and a particular signal, such as the frame data synchronizing signal or the row data synchronizing signal, in the transmission packet P_Tra can also be utilized to accumulate a number of the received particular signals in the register of the display device 340 or the slave device 320. After the master device 300 has transmitted the N number of the transmission packets P_Tra, a fourth monitor module (not shown in the figure) in the master device 300 will correspondingly process a monitor process to monitor the accumulated number of the particular signals, so as to determine whether the transmission mode between the master device 300 and the slave device 320 is changed in the video mode transmission operation. Please refer to FIG. 14, which illustrates a flow chart of a monitor process 14 for the data transmission system 30 shown in FIG. 3. As shown in FIG. 14, the monitor process 14 includes the steps as follows:

Step 1400: Start.

Step 1402: After the master device 300 utilizes the high speed transmission mode to transmit the N number of the transmission packets P_Tra, the N number of the transmission packets P_Tra are stored in the register of the display device 340 (or the slave device 320), to accumulate the number of the particular signals in the stored transmission packets P_Tra.

Step 1404: The master device 300 utilizes the fourth monitor module to monitor the accumulated number of the particular signals, so as to switch the transmission mode between the master device 300 and the slave device 320.

Step 1406: When the accumulated number of the particular signals in the register is larger than a predetermined number, the fourth monitor module determines that the master device 300 continuously utilizes the high speed transmission mode. Otherwise, step 1408 is processed.

Step 1408: When the accumulated number of the particular signals in the register is not larger than the predetermined number, the fourth monitor module determines that the master device 300 switches to the low power transmission mode.

Step 1410: End.

Noticeably, from step 1404 to step 1408 of the monitor process 14, the fourth monitor module of the master device 300 determines that the register has stored the number of the particular signals being larger than the predetermined number, such that the transmission mode between the master device 300 and the slave device 320 is switched. Certainly, those skilled in the art can integrate the monitor process 14 with the data transmission process 50 to simultaneously consider the feedback signal S_FB as well as the number of the particular signals, so as to provide more operations of the data transmission system 30 applied to the display device 340. Also, the N number of the transmission packets P_Tra mentioned in step 1402 can also be adjusted according to different requirements, and is not limiting the scope of the invention.

Figure 15:
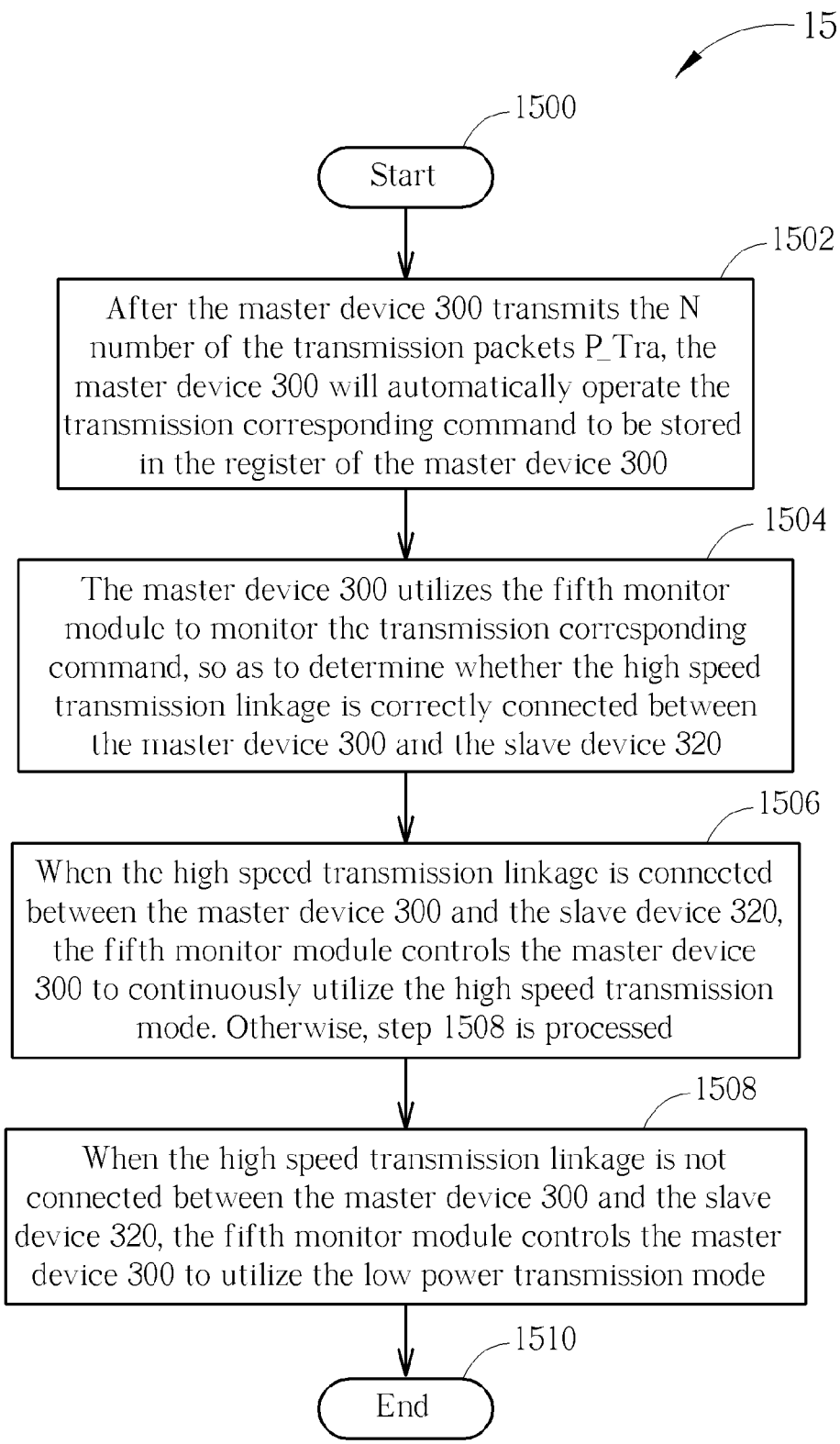
FIG. 15 illustrates a flow chart of a command monitor process for the data transmission system shown in FIG. 3.

Please refer to FIG. 3 again. When the master device 300 has transmitted the N number of transmission packets P_Tra, the master device 300 will automatically operate a transmission corresponding command (not shown in the figure) to be stored in a register of the master device 300, and a fifth monitor module of the master device 300 is utilized to monitor whether a high speed transmission linkage is correctly connected between the master device 300 and the slave device 320 in the video mode transmission operation or in the command mode transmission operation. For example, please refer to FIG. 15, which illustrates a flow chart of a command monitor process 15 for the data transmission system 30 shown in FIG. 3. As shown in FIG. 15, the monitor process 15 includes the following steps:

Step 1500: Start.

Step 1502: After the master device 300 transmits the N number of the transmission packets P_Tra, the master device 300 will automatically operate the transmission corresponding command to be stored in the register of the master device 300.

Step 1504: The master device 300 utilizes the fifth monitor module to monitor the transmission corresponding command, so as to determine whether the high speed transmission linkage is correctly connected between the master device 300 and the slave device 320.

Step 1506: When the high speed transmission linkage is connected between the master device 300 and the slave device 320, the fifth monitor module controls the master device 300 to continuously utilize the high speed transmission mode. Otherwise, step 1508 is processed.

Step 1508: When the high speed transmission linkage is not connected between the master device 300 and the slave device 320, the fifth monitor module controls the master device 300 to utilize the low power transmission mode.

Step 1510: End.

Noticeably, in the command monitor process 15, the transmission corresponding command in the register can be any other signal changes according to different requirements, such as the low level signal, the high level signal, or the toggle signal. Accordingly, the fifth monitor module of the master device 300 can determine whether the mentioned signal changes comply with the predetermined signals of the user, and then switch the transmission mode between the master device 300 and the slave device 320. Certainly, those skilled in the art can integrate the monitor process 15 with the data transmission process 50 to simultaneously consider the feedback signal S_FB as well as the mentioned signal changes, so as to provide more operations of the data transmission system 30 applied to the display device 340. Also, the N number of the transmission packets P_Tra mentioned in step 1502 can also be adjusted according to different requirements, and is not limiting the scope of the invention.

Figure 16:
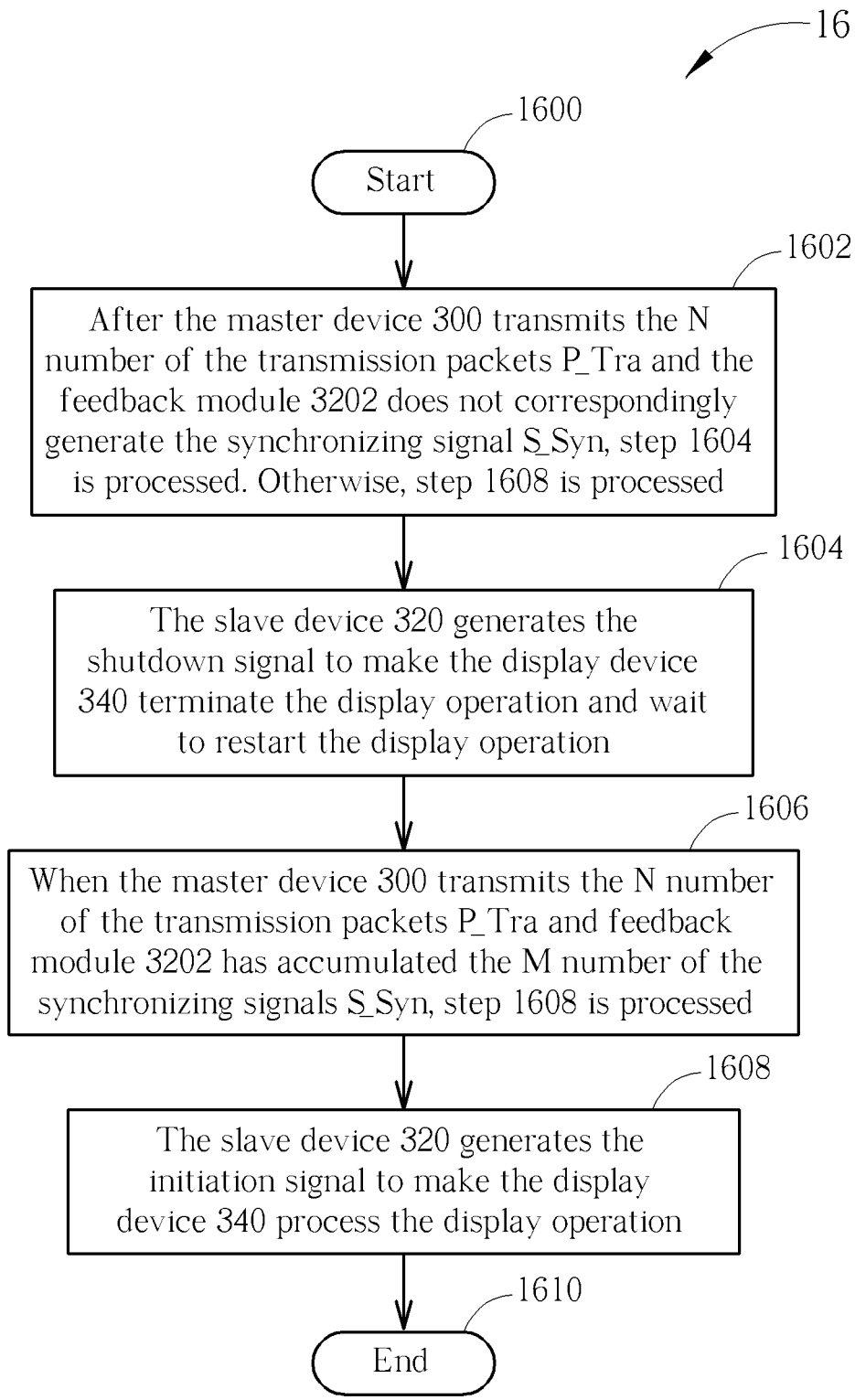
FIG. 16 illustrates a flow chart of a turning on/off process for the data transmission system shown in FIG. 3.

Lastly, please refer to FIG. 3 again. In the video mode transmission operation, when the master device 300 utilizes the high speed transmission mode to transmit the N number of the transmission packets P_Tra, the feedback module 3202 of the slave device 320 does not correspondingly generate the synchronizing signal S_Syn. Under such circumstances, the master device 300 will determine that the slave device 320 does not correctly receive the transmission packet P_Tra, and a shutdown signal is correspondingly generated via the slave device 320 to be transmitted to the display device 340, such that the display device 340 will terminate its display operation to wait for restarting the display operation again. When the slave device 320 correctly receives the plurality of transmission packets P_Tra to make the feedback module 3202 correspondingly generate the plurality of synchronizing signals S_Syn, the slave device 320 generates an initiation signal (not shown in the figure) to the display device 340, to make the display device 340 restart the display operation. For example, please refer to FIG. 16, which illustrates a flow chart of a turning on/off process 16 for the data transmission system 30 shown in FIG. 3. As shown in FIG. 16, the turning on/off process 16 includes the steps as follows:

Step 1600: Start.

Step 1602: After the master device 300 transmits the N number of the transmission packets P_Tra and the feedback module 3202 does not correspondingly generate the synchronizing signal S_Syn, step 1604 is processed. Otherwise, step 1608 is processed.

Step 1604: The slave device 320 generates the shutdown signal to make the display device 340 terminate the display operation and wait to restart the display operation.

Step 1606: When the master device 300 transmits the N number of the transmission packets P_Tra and feedback module 3202 has accumulated the M number of the synchronizing signals S_Syn, step 1608 is processed.

Step 1608: The slave device 320 generates the initiation signal to make the display device 340 process the display operation.

Step 1610: End.

Noticeably, those skilled in the art can integrate operations of the turning on/off process 16 and the data transmission process 50 to provide more operations of the data transmission system 30 applied to the display device 340. Also, the number N or M in step 1602 or step 1606 can also be adjusted according to different requirements, and is not limiting the scope of the invention.

In summary, the invention provides a data transmission system and method, which discloses that a master device encodes an original packet to be a transmission packet for transmitting the transmission packet to a slave device. Accordingly, the slave device transmits a feedback signal to the master device to make the master device dynamically monitor a reception condition or a decoding condition of the slave device, such that a transmission mode between the master device and the slave device can be switched between a high speed transmission mode and a low power transmission mode. Besides, the master device can also monitor a display device coupled to the slave device, or other monitor modules/operations can also be utilized for the master device as another determination, so as to switch the transmission mode for complying with a command/video mode of the MIPI. Therefore, the original data can be correctly received by the slave device and the display device, and in the meanwhile, the unnecessary waiting periods as well as the operational powers can be correspondingly saved during the transmission process to increase the application range of the data transmission system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission system utilized in a Mobile Industry Processor Interface (MIPI) comprising:
   a master device comprising:
      a control module for generating, according to a feedback signal, a control signal according to which a transmission mode is thereby determined; and
      a packet encoding module coupled to the control module for encoding an original packet to be a transmission packet according to the original packet and the control signal, and processing a transmission operation under the determined transmission mode; and a slave device, for generating the feedback signal, comprising:
- a packet decoding module for decoding the transmission packet to be the original packet or a related display device signal corresponding to the original packet; and
- a feedback module coupled to the packet decoding module, for generating a synchronizing signal when a decoding condition of the packet decoding module indicates that the transmission packet is correctly received or decoded, and for not generating the synchronizing signal when the decoding condition indicates that the transmission packet is not correctly received or decoded;
- wherein the feedback signal indicates whether the synchronizing signal is generated.

2. The data transmission system of claim 1, wherein the transmission mode is a high speed transmission mode or a low power transmission mode.

3. The data transmission system of claim 1, wherein the feedback signal is transmitted to the control module of the master device from the feedback module of the slave device.

4. The data transmission system of claim 3, wherein the control module receives the feedback signal and generates, in response to receiving the feedback signal which comprises the synchronizing signal, the control signal that controls the packet encoding module to be processed in a high speed transmission mode.

5. The data transmission system of claim 1, wherein the slave module further comprises a first monitor module for determining whether the synchronizing signal is received from the feedback module within a predetermined period, and generating a first flag signal which has an alternative level indicating that the synchronizing signal is received or not from the feedback module, wherein the first flag signal is set to be the feedback signal generated by the slave device.

6. The data transmission system of claim 5, wherein when the first monitor module determines that the synchronizing signal is not received from the feedback module within the predetermined period, the control module of the master device generates, in response to receiving the first flag signal indicating that the synchronizing signal is not received, the control signal that controls the packet encoding module to be processed in a low power transmission mode.

7. The data transmission system of claim 6, wherein the slave module further comprises a second monitor module for determining whether a predetermined packet is included in the received transmission packet within a predetermined period, and generating a second flag signal which has an alternative level indicating that the predetermined packet is received or not, wherein the second flag signal is set to be the feedback signal generated by the slave device.

8. The data transmission system of claim 7, wherein when the second monitor module determines that the predetermined packet is not received within the predetermined period, the control module of the master device generates, in response to receiving the second flag signal indicating that the predetermined packet is not received, the control signal that controls the packet encoding module to be processed in a low power transmission mode.

9. The data transmission system of claim 8, wherein when the second monitor module determines that the predetermined packet is not received within the predetermined period, a reset signal is correspondingly generated by the slave device to be transmitted to the packet decoding module for processing a reset mode.

10. The data transmission system of claim 9, wherein when the second monitor module first receives the predetermined packet, the slave device is correspondingly initiated to drive a display device for displaying an imaging data.

11. The data transmission system of claim 2, wherein the master device further comprises a third monitor module to determine the transmission mode of the packet encoding module according to a bus turn around (BTA) process.

12. The data transmission system of claim 2, wherein the display device further comprises a register to correspondingly receive the original packet from the slave device, and the master device further comprises a fourth monitor module to monitor a reception condition of the register according to a monitor process after a predetermined number of the transmission packets are transmitted by the master device, so as to determine the transmission mode of the packet encoding module.

13. The data transmission system of claim 2, wherein when a predetermined number of the transmission packets are transmitted by the master device, a transmission corresponding command is correspondingly generated to be stored in a register, and the master device further comprises a fifth monitor module to monitor the transmission corresponding command for determining the transmission mode according to a command monitor process.

14. The data transmission system of claim 2, wherein if the feedback signal does not comprise the synchronizing signal and after a predetermined number of the transmission packets are transmitted by the master device utilizing the high speed transmission mode, the slave device generates an initiation signal to the display device for processing an initiation mode.

15. The data transmission system of claim 2, wherein the transmission packet comprises a plurality of frame data, and each of the plurality of frame data comprises a plurality of row data.

16. The data transmission system of claim 15, wherein each of the plurality of frame data corresponds to a frame data synchronizing signal, and each of the plurality of row data corresponds to a row data synchronizing signal.

17. The data transmission system of claim 16, wherein the high speed transmission mode utilizes a differential process to transmit the plurality of frame data and the plurality of row data thereof.

18. The data transmission system of claim 1, wherein the MIPI utilizes a video mode transmission process or a command mode transmission process to transmit the original packet to the display device.

19. The data transmission system of claim 18, wherein via utilizing the command mode transmission process, the transmission packet further comprises a predetermined written packet as 0X2C format.

20. A data transmission method for a data transmission system comprising a master device and a slave device and utilized in a Mobile Industry Processor Interface (MIPI), the data transmission method comprises:
- the master device generating, according to a feedback signal, a control signal according to which a transmission mode is thereby determined;
- the master device encoding an original packet to be a transmission packet according to the original packet and the control signal, and processing a transmission operation under the determined transmission mode;
- the slave device decoding the transmission packet to be the original packet or a related display device signal corresponding to the original packet; and the slave device generating a synchronizing signal when a decoding condition of a packet decoding module of the slave device indicates that the transmission packet is correctly received or decoded, and not generating the synchronizing signal when the decoding condition indicates that the transmission packet is not correctly received or decoded;

wherein the feedback signal indicates whether the synchronizing signal is generated.

21. The data transmission method of claim 20, wherein the transmission mode is a high speed transmission mode or a low power transmission mode.

22. The data transmission method of claim 20, wherein the feedback signal is transmitted to a control module of the master device from a feedback module of the slave device, and the data transmission method further comprising:

the control module receiving the feedback signal and generating, in response to receiving the feedback signal which comprises the synchronizing signal, the control signal that controls a packet encoding module of the master device to be processed in a high speed transmission mode; and the control module receiving the feedback signal and generating, in response to receiving the feedback signal which does not comprise the synchronizing signal, the control signal that controls the packet encoding module to be processed in a low power transmission mode.

23. The data transmission method of claim 22, further comprising:

determining, by a first monitor module of the slave device, whether the synchronizing signal from the feedback module is received by the slave module within a predetermined period; and generating, by the first monitor module, a first flag signal which has an alternative level indicating that the synchronizing signal is received or not from the feedback module, wherein the first flag signal is set to be the feedback signal generated by the slave device.

24. The data transmission method of claim 23, further comprising:

determining, by a second monitor module of the slave device, whether a predetermined packet is included in the received transmission packet within a predetermined period; and generating, by the second monitor module, a second flag signal which has an alternative level indicating that the predetermined packet is received or not, wherein the second flag signal is set to be the feedback signal generated by the slave device.

25. The data transmission method of claim 24, wherein when the second monitor module determines that the predetermined packet is not received within the predetermined period, the control module generates, in response to receiving the second flag signal indicating that the predetermined packet is not received, the control signal that controls the packet encoding module to be processed in the low power transmission mode, a reset signal is correspondingly generated by the slave device for processing a reset mode.

26. The data transmission method of claim 25, wherein when the predetermined packet is first received, the display device is driven for displaying an imaging data.

27. The data transmission method of claim 21, further utilizing a bus turn around (BTA) process and a third monitor module to determine the transmission mode.

28. The data transmission method of claim 21, further utilizing a monitor process and a fourth monitor module to monitor a reception condition of a register after the register receives a predetermined number of the transmission packets, to determine the transmission mode.

29. The data transmission method of claim 21, further utilizing a command monitor process and a fifth monitor module, and after transmitting a predetermined number of the transmission packets and correspondingly generating a transmission corresponding command in a register, monitoring the transmission corresponding command for determining the transmission mode.

30. The data transmission method of claim 21, wherein when the feedback signal does not comprise the synchronizing signal and after a predetermined number of the transmission packets are transmitted via the high speed transmission mode, an initiation signal is generated to the display device for processing an initiation mode.

31. The data transmission method of claim 21, wherein the high speed transmission mode utilizes a differential process to transmit a plurality of frame data and a plurality of row data thereof.

32. The data transmission method of claim 20, wherein the MIPI utilizes a video mode transmission process or a command mode transmission process to transmit the original packet to the display device.

33. The data transmission method of claim 32, wherein the command mode transmission process further comprises utilizing a predetermined written packet as 0X2C format.

34. The data transmission system of claim 3, wherein the control module receives the feedback signal and generates, in response to receiving the feedback signal which does not comprise the synchronizing signal, the control signal that controls the packet encoding module to be processed in a low power transmission mode.

35. The data transmission system of claim 5, wherein when the first monitor module determines that the synchronizing signal is received from the feedback module within the predetermined period, the control module of the master device generates, in response to receiving the first flag signal indicating that the synchronizing signal is received, the control signal that controls the packet encoding module to be processed in a high speed transmission mode.

36. The data transmission system of claim 7, wherein when the second monitor module determines that the predetermined packet is received from the feedback module within the predetermined period, the control module of the master device generates, in response to receiving the second flag signal indicating that the predetermined packet is received, the control signal that controls the packet encoding module to be processed in a high speed transmission mode.

37. The data transmission method of claim 23, wherein when the first monitor module determines that the synchronizing signal is not received from the feedback module within the predetermined period, the control module generates, in response to receiving the first flag signal indicating that the synchronizing signal is not received, the control signal that controls the packet encoding module to be processed in the low power transmission mode, and when the first monitor module determines that the synchronizing signal is received from the feedback module within the predetermined period, the control module generates, in response to receiving the first flag signal indicating that the synchronizing signal is received, the control signal that controls the packet encoding module to be processed in the high speed transmission mode.

38. The data transmission method of claim 24, wherein when the second monitor module determines that the predetermined packet is received from the feedback module within the predetermined period, the control module generates, in response to receiving the second flag signal indicating that the predetermined packet is received, the control signal that controls the packet encoding module to be processed in the high speed transmission mode, and when the second monitor module determines that the predetermined packet is not received within the predetermined period, the control module generates, in response to receiving the second flag signal indicating that the predetermined packet is not received, the control signal that controls the packet encoding module to be processed in the low power transmission mode.

* * * * *